United States Patent
Liu et al.

(10) Patent No.: US 10,785,824 B2
(45) Date of Patent: Sep. 22, 2020

(54) INFORMATION PROCESSING METHOD AND RELATED APPARATUS

(71) Applicant: HUAWEI TECHNOLOGIES CO., LTD., Shenzhen, Guangdong (CN)

(72) Inventors: Jing Liu, Shanghai (CN); Yi Guo, Shenzhen (CN); Mingzeng Dai, Shanghai (CN); Wenjie Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/714,235

(22) Filed: Dec. 13, 2019

(65) Prior Publication Data

US 2020/0120750 A1 Apr. 16, 2020

Related U.S. Application Data

(63) Continuation of application No. PCT/CN2018/091557, filed on Jun. 15, 2018.

(30) Foreign Application Priority Data

Jun. 16, 2017 (CN) .......................... 2017 1 0459681
Aug. 11, 2017 (CN) .......................... 2017 1 0687862

(51) Int. Cl.
*H04W 72/04* (2009.01)
*H04W 48/16* (2009.01)
(Continued)

(52) U.S. Cl.
CPC ............ *H04W 80/08* (2013.01); *H04W 76/11* (2018.02); *H04W 76/15* (2018.02); *H04W 84/20* (2013.01)

(58) Field of Classification Search
CPC ......... H04W 36/0069; H04W 36/0055; H04W 76/15; H04W 36/0027; H04W 36/08;
(Continued)

(56) References Cited

U.S. PATENT DOCUMENTS 10,278,115 B2 * 4/2019 Wu ........................ H04W 36/00
10,313,879 B2 * 6/2019 Wu ........................ H04W 12/04
(Continued)

FOREIGN PATENT DOCUMENTS

CN 103139911 A 6/2013
CN 105659688 A 6/2016
(Continued)

OTHER PUBLICATIONS

3GPP TS 36331 V14.2.2 (Apr. 2017), "3rd Generation Partnership Project; Technical Specification Group Radio Acces Network Evolved Universal Terrestrial Radio Access (E-UTRA); Radio Resource Control (RRC); Protocol specification (Release 14)," Apr. 2017, total 721 pages.
(Continued)

*Primary Examiner* — Sai Aung
(74) *Attorney, Agent, or Firm* — Fish & Richardson P.C.

(57) ABSTRACT

Embodiments of this application disclose an information processing method, a base station, and a terminal. The method includes: receiving, by a master base station, a new radio packet data convergence protocol (NR PDCP) configuration and identification information of a data radio bearer (DRB) corresponding to the NR PDCP configuration from a secondary base station; and sending, by the master base station, the NR PDCP configuration and the identification information of the DRB to a terminal, where the master base station and the secondary base station are base stations of different radio access technologies (RATs).

22 Claims, 13 Drawing Sheets

(51) Int. Cl.
    *H04W 80/08*    (2009.01)
    *H04W 76/15*    (2018.01)
    *H04W 76/11*    (2018.01)
    *H04W 84/20*    (2009.01)

(58) Field of Classification Search
    CPC ..... H04W 36/18; H04W 76/27; H04W 80/02; H04W 88/06; H04W 88/10; H04W 12/0017
    See application file for complete search history.

(56) References Cited

U.S. PATENT DOCUMENTS

| | | | |
|---|---|---|---|
| 10,462,709 B2 * | 10/2019 | Hong | H04W 36/00837 |
| 10,555,201 B2 * | 2/2020 | Kim | H04L 1/1642 |
| 2015/0124748 A1 | 5/2015 | Park et al. | |
| 2016/0212661 A1 * | 7/2016 | Basu Mallick | H04L 1/1614 |
| 2017/0034866 A1 * | 2/2017 | Wager | H04L 5/0091 |
| 2018/0160411 A1 | 6/2018 | Zhang et al. | |

FOREIGN PATENT DOCUMENTS

| | | |
|---|---|---|
| CN | 106792869 A | 5/2017 |
| WO | 2015115959 A1 | 8/2015 |

OTHER PUBLICATIONS

3GPP TS 38331 V0.0.3 (May 2015), "3rd Generation Partnership Project; Technical Specification Group Radio Access Network; NR; Radio Resource Control (RRC); Protocol specification (Release 15)," May 2017, 20 pages.

PCT International Search Report and Written Opinion issued in International Application No. PCT/CN2018/091557 dated Sep. 3, 2018, 17 pages (with English translation).

Ericsson, "Overview of RRC architecture options for the LTE-NR tight interworking," 3GPP TSG-RAN WG2 #94, Tdoc R2-164005; Nanjing, China, XP051105340, May 23-27, 6 pages.

Extended European Search Report issued in European Application No. 18818421.2 dated Apr. 1, 2020, 11 pages.

HTC, "RRC message and transport for EN-DC," 3GPP TSG-RAN WG2#98, R2-1705698; Hangzhu, China, XP051276004, May 15-19, 2017, 4 pages.

Huawei, "Considerattons on container for common PDCP," 3GPP TSG-RAN WG3 #97, R3-173177; Berlin, Germany, XP051320008, Aug. 21-25, 2017, 2 pages.

Intel Corporation:,"In supporting unified split bearer option for EN-DC," 3GPP TSG RAN WG3 Meeting #96, R3-171777; Hangzhou, China, XP051276560,May 15-19, 2017, 2 pages.

Intel Corporation, "RRC aspects of unifying split bearer types," 3GPP TSG-RAN WG2 Meeting #98, R2-1704798, Hangzhou, China, XP051275318, May 15-19, 2017, 6 pages.

Zte et al., "Consideration on the transmission of NR RRC Message in LTE/NR tight interworking," 3GPP TSG RAN WG2 Meeting #95bis, R2-166340; Kaohsiung, XP051150912, Oct. 10-14, 2016, 4 pages.

ZTE, "Discussion on control plane for the DC based LTE/NR tight interworking," 3GPP TSG RAN WG2 Meeting #94, R2-163741; Nanjing, China, XP051105152, May 23-27, 2016, XP051105152, 4 pages.

* cited by examiner

| RRCConnectionReconfiguration (RRC reconfiguration message) | RadioResourceConfigDedicated (configurations of a DRB and an SRB on an MCG) | SRB-ToAddMod (used to configure an SRB bearer) | | | | |
| --- | --- | --- | --- | --- | --- | --- |
| | | DRB-ToAddMod (used to configure a DRB bearer) | EPS ID (identification information of an EPS bearer) | | | |
| | | | DRB ID (identification information of a DRB bearer) | | | |
| | SCG-ConfigpartSCG (configuration of a DRB on an SCG) | DRB-ToAddModList SCG (used to configure a DRB bearer) | DRB ID | | Split | |
| | | | | | SCG | |
| | CommPDCPConfigList (common packet data convergence protocol list) | DRB ID | | | | |
| | | Container (container) | | | | |

FIG. 6

| RRCConnectionReconfiguration (RRC reconfiguration message) | RadioResourceConfigDedicated (configurations of a DRB and an SRB on an MCG) | SRB-ToAddMod (used to configure an SRB bearer) | | |
|---|---|---|---|---|
| | | DRB-ToAddMod (used to configure a DRB bearer) | EPS ID (identification information of an EPS bearer) | |
| | | | DRB ID (identification information of a DRB bearer) | |
| | | | Container (container) | |
| | SCG-ConfigpartSCG (configuration of a DRB on an SCG) | DRB-ToAddModList SCG (used to configure a DRB bearer) | DRB ID | |
| | | | Container | |
| | CommPDCPConfigList (common packet data convergence protocol list) | | | Split |
| | | | | SCG | EPS ID |
| | | | | | Container |

FIG. 7

| SgNB addition request acknowledge (SgNB addition request acknowledge) | DRB ID (identification information of a DRB bearer) |
| --- | --- |
| | First container (carrying an NR PDCP configuration) |
| | Second container (carrying an RLC/MAC/PHY/logical channel configuration of an SgNB) |

FIG. 10

| RRCConnection Reconfiguration (RRC reconfiguration message) | DRB ID | Identification information of a DRB bearer |
| --- | --- | --- |
| | NR PDCP configuration | First container (carrying the NR PDCP configuration) obtained from an SgNB |
| | MeNB air interface configuration | Carrying an RLC/MAC/PHY/logical channel configuration of an MeNB |
| | SgNB air interface configuration | Second container (carrying an RLC/MAC/PHY/logical channel configuration of the SgNB) obtained from the SgNB |

FIG. 11

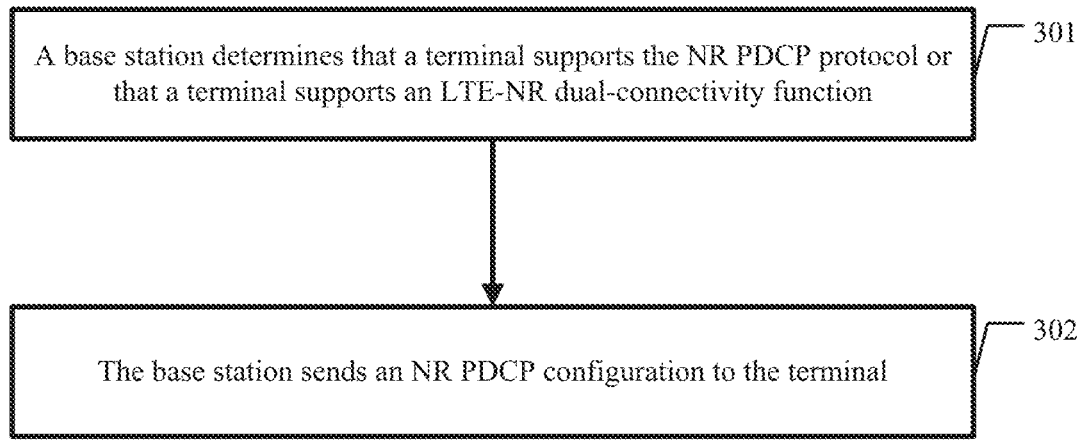

FIG. 12

INFORMATION PROCESSING METHOD AND RELATED APPARATUS

CROSS-REFERENCE TO RELATED APPLICATIONS

This application is a continuation of International Application No. PCT/CN2018/091557, filed on Jun. 15, 2018, which claims priority to Chinese Patent Application No. 201710459681.1, filed on Jun. 16, 2017 and Chinese Patent Application No. 201710687862.X, filed on Aug. 11, 2017, all of which are incorporated herein by reference in their entireties.

TECHNICAL FIELD

Embodiments of this application relate to the communications field, and in particular, to an information processing method, a base station, and a terminal.

BACKGROUND

In future 5th generation (5G) network construction, dual connectivity (DC) between a long term evolution (LTE) system and a new radio (NR) system ("LTE-NR DC" for short) may be used to enable a terminal to obtain radio resources from both an LTE air interface and an NR air interface, thereby improving radio resource utilization and increasing a transmission rate.

In an LTE-NR DC scenario, a master base station and a secondary base station are base stations of different RATs. For example, the master base station is an LTE base station, and the secondary base station is an NR base station. In this scenario, how the terminal obtains an NR PDCP configuration needs an urgent solution.

SUMMARY

Embodiments of this application provide an information processing method, a base station, and a terminal, to resolve a problem about how a terminal obtains an NR PDCP configuration in an LTE-NR DC scenario.

To resolve the foregoing problem, this application provides the following technical solutions.

According to a first aspect, this application provides an information processing method. The method includes: receiving, by a master base station, an NR PDCP configuration and identification information of a data radio bearer (DRB) corresponding to the NR PDCP configuration from a secondary base station; after receiving the NR PDCP configuration and the identification information of the DRB, forwarding, by the master base station, the NR PDCP configuration and the identification information of the DRB to a terminal, where the master base station and the secondary base station are base stations of different RATs. It can be learned that in the first aspect of this application, when the master base station and the secondary base station are base stations of different RATs, if an existing LTE DC mechanism is used, the master base station may directly discard content sent by the secondary base station because the master base station cannot parse the content. To avoid such a problem in an LTE-NR DC scenario, the secondary base station directly sends the NR PDCP configuration and the identification information of the DRB corresponding to the NR PDCP configuration to the master base station via an interface between the master base station and the secondary base station, and the master base station directly forwards the received NR PDCP configuration and the received identification information of the corresponding DRB to the terminal, without parsing the NR PDCP configuration generated by the secondary base station.

In a possible implementation, the receiving, by a master base station, an NR PDCP configuration and identification information of a DRB corresponding to the NR PDCP configuration from a secondary base station is specifically; receiving, by the master base station, a first container including the NR PDCP configuration from the secondary base station, and receiving the identification information of the DRB corresponding to the NR PDCP configuration from the secondary base station, where the first container has a one-to-one correspondence with the identification information of the DRB; and sending, by the master base station to the terminal, the identification information of the DRB corresponding to the NR PDCP configuration and the first container including only the NR PDCP configuration. It can be learned that in this implementation, the secondary base station encapsulates only the generated NR PDCP configuration into a container and sends the container to the master base station. Because the master base station does not need to parse content in the first container, the master base station does not consider the received first container as an error packet, and finally successfully delivers the NR PDCP configuration to the terminal by using the first container. This effectively resolves a problem about how the secondary base station delivers the configuration to the terminal.

In a possible implementation, the receiving, by a master base station, an NR PDCP configuration and identification information of a DRB corresponding to the NR PDCP configuration from a secondary base station is specifically; receiving, by the master base station, a first container including both the NR PDCP configuration and the identification information of the DRB corresponding to the NR PDCP configuration from the secondary base station, where the NR PDCP configuration has a one-to-one correspondence with the identification information of the DRB; and sending, by the master base station, the first container to the terminal. It can be learned that a difference from the foregoing implementation lies in that the first container not only includes the NR PDCP configuration of the secondary base station, but also includes the identification information of the DRB corresponding to the NR PDCP configuration, that is, the first container includes the NR PDCP configuration of the secondary base station and the identification information of the DRB corresponding to the NR PDCP configuration. This increases diversity of the solution.

In a possible implementation, the master base station may receive the NR PDCP configuration and the identification information of the DRB corresponding to the NR PDCP configuration that are sent by the secondary base station, from an interface message transmitted between the master base station and the secondary base station, for example, an SgNB addition request acknowledge message, an SgNB modification request acknowledge message, an SgNB modification required message, or an SgNB change required message.

In a possible implementation, the master base station further receives a second container from the secondary base station, where the second container includes an air interface configuration of the secondary base station, and the air interface configuration of the secondary base station that is described herein does not include the NR PDCP configuration; and the master base station sends the second container received from the secondary base station to the terminal. In addition, the second container also has a one-to-one correspondence with the identification information of the DRB. In this implementation, the master base station not only sends the NR PDCP configuration to the terminal, but also sends the air interface configuration of the secondary base station to the terminal. This ensures integrity of the solution.

In a possible implementation, both the master base station and the secondary base station use NR PDCP, that is, both the master base station and the secondary base station use the NR PDCP protocol.

According to a second aspect, this application provides an information processing method. The method includes: generating, by a secondary base station, an NR PDCP configuration; sending, by the secondary base station to a master base station, the NR PDCP configuration and identification information of a DRB corresponding to the NR PDCP configuration, so that the master base station forwards the NR PDCP configuration and the identification information of the DRB corresponding to the NR PDCP configuration to a terminal, where the master base station and the secondary base station are base stations of different RATs.

In a possible implementation, the generating, by a secondary base station, an NR PDCP configuration includes: generating, by the secondary base station, a first container including only the NR PDCP configuration. The sending, by the secondary base station to a master base station, the NR PDCP configuration and identification information of a DRB corresponding to the NR PDCP configuration includes: sending, by the secondary base station, the first container generated by the secondary base station to the master base station, where the first container has a one-to-one correspondence with the identification information of the DRB.

In a possible implementation, the generating, by a secondary base station, an NR PDCP configuration includes: generating, by the secondary base station, a first container including the NR PDCP configuration and the identification information of the DRB corresponding to the NR PDCP configuration, where the NR PDCP configuration has a one-to-one correspondence with the identification information of the DRB; and the sending, by the secondary base station to a master base station, the NR PDCP configuration and identification information of a DRB corresponding to the NR PDCP configuration includes: sending, by the secondary base station, the first container to the master base station. In this way, this implementation proposes another manner for sending the NR PDCP configuration and the identification information of the DRB corresponding to the NR PDCP configuration to the master base station by the secondary base station. This increases diversity of the solution.

According to a third aspect, an embodiment of this application provides an information processing method. The method includes:

receiving, by a terminal, an NR PDCP configuration and identification information of a DRB corresponding to the NR PDCP configuration from a master base station; and performing, by the terminal, PDCP layer configuration on the DRB based on the received NR PDCP configuration and the received identification information of the DRB. It can be learned that in this implementation, after receiving the NR PDCP configuration and the identification information of the DRB from the master base station, the terminal may perform PDCP layer configuration on the DRB by using the NR PDCP configuration and the identification information of the DRB.

In a possible implementation, the receiving, by a terminal, an NR PDCP configuration and identification information of a DRB corresponding to the NR PDCP configuration from a master base station includes: receiving, by the terminal, a first container including only the NR PDCP configuration generated by a secondary base station from the master base station; and receiving the identification information of the DRB corresponding to the NR PDCP configuration from the master base station, where the first container has a one-to-one correspondence with the identification information of the DRB.

In a possible implementation, the receiving, by a terminal, an NR PDCP configuration and identification information of a DRB corresponding to the NR PDCP configuration from a master base station includes: receiving, by the terminal, a first container including the NR PDCP configuration and the identification information of the DRB from the master base station, where the NR PDCP configuration has a one-to-one correspondence with the identification information of the DRB, and the first container is generated by the secondary base station.

In a possible implementation, the terminal further receives a second container including an air interface configuration of the secondary base station from the master base station, where the air interface configuration of the secondary base station does not include the NR PDCP configuration.

According to a fourth aspect, an embodiment of this application provides an information processing method. The method includes: determining, by a first base station, that a terminal supports the NR PDCP protocol or that a terminal supports an LTE-NR dual-connectivity function; and sending, by the first base station, an NR PDCP configuration to the terminal. In other words, in this application, once the first base station determines that the terminal supports the NR PDCP protocol or that the terminal supports the LTE-NR dual-connectivity function, the first base station can send the NR PDCP configuration to the terminal. In this way, a manner of sending, by a base station, an NR PDCP configuration to UE in an appropriate scenario is proposed to avoid switching between the LTE PDCP protocol and the NR PDCP protocol.

In a possible implementation, when the terminal initially accesses the first base station, the determining, by a first base station, that a terminal supports the NR PDCP protocol or that a terminal supports an LTE-NR dual-connectivity function includes: receiving, by the first base station from the terminal, capability information reported by the terminal; and determining, by the first base station based on the capability information reported by the terminal, that the terminal supports the NR PDCP protocol or that the terminal supports the LTE-NR dual-connectivity function. Alternatively, when the terminal initially accesses the first base station, the determining, by a first base station, that a terminal supports an NR PDCP protocol or that a terminal supports an LTE-NR dual-connectivity function includes: receiving, by the first base station, one piece of indication information from the terminal, where the indication information may be carried in a message sent by the terminal in a random access procedure, for example, may be carried in a preamble sent by the terminal, or may be carried in, for example, an RRC connection establishment request message, an RRC connection re-establishment request message, or an RRC connection establishment complete message; and determining, by the first base station based on the indication information, that the terminal supports the NR PDCP protocol or that the terminal supports the LTE-NR dual-connectivity function. In other words, in this implementation, when the terminal initially accesses the first base station, once the first base station determines, based on the capability information reported by the terminal or the indication information sent by the terminal, that the terminal supports the NR PDCP protocol or that the terminal supports the LTE-NR dual-connectivity function, the first base station can send the NR PDCP configuration (PDCP layer configuration information corresponding to an NR protocol) to the terminal. In this way, a specific transmission scenario in which the base station may send the NR PDCP configuration to the terminal is proposed, improving feasibility of the solution.

In a possible implementation, when the terminal that has accessed the first base station enters active mode from idle mode, the determining, by a first base station, that a terminal supports the NR PDCP protocol or that a terminal supports an LTE-NR dual-connectivity function includes: receiving, by the first base station, capability information of the terminal from a core network device; and determining, by the first base station based on the capability information of the terminal, that the terminal supports the NR PDCP protocol or that the terminal supports the LTE-NR dual-connectivity function. In other words, because the core network device stores the capability information of the terminal, when a mode of the terminal changes, the first base station can directly obtain the capability information of the terminal from a core network, instead of proactively obtaining the capability information from the terminal. In this implementation, during mode switching of the terminal, once the first base station determines that the terminal supports the NR PDCP protocol or that the terminal supports the LTE-NR dual-connectivity function, the first base station can send the NR PDCP configuration to the terminal. In this way, another transmission scenario in which the NR PDCP configuration can be sent is proposed, improving feasibility and diversity of the solution.

In a possible implementation, when the terminal is handed over from a second base station to the first base station, the determining, by a first base station, that a terminal supports the NR PDCP protocol or that a terminal supports an LTE-NR dual-connectivity function includes: obtaining, by the first base station, capability information of the terminal from the second base station; and determining, by the first base station based on the capability information of the terminal, that the terminal supports the NR PDCP protocol or that the terminal supports the LTE-NR dual-connectivity function, where the first base station and the second base station are base stations of different RATs. Because the terminal establishes a connection to the second base station before the handover, and the second base station has obtained the capability information of the terminal, when the terminal is handed over from the second base station to the first base station, the first base station may directly obtain the capability information of the terminal from the second base station. That is, in this implementation, when the terminal is handed over from the second base station to the first base station, once the first base station determines that the terminal supports the NR PDCP protocol or that the terminal supports the LTE-NR dual-connectivity function, the first base station can send the NR PDCP configuration to the terminal. In this way, another transmission scenario in which a base station can send the NR PDCP configuration is proposed.

In a possible implementation, when the terminal accesses both the first base station and the second base station, where the first base station is an NR base station and serves as a master base station, the second base station is an LTE base station and serves as a secondary base station, and the master base station and the secondary base station form a dual-connectivity scenario, the method further includes: after determining to enable the dual-connectivity function for the terminal, sending, by the first base station, a secondary base station addition request message to the second base station, where the message carries capability information indicating that the terminal supports the NR PDCP protocol or supports the LTE-NR dual-connectivity function; and after the second base station obtains the capability information of the terminal, and learns that the terminal supports the NR PDCP protocol or supports the LTE-NR dual-connectivity function, generating, by the second base station, the NR PDCP configuration, and sending the NR PDCP configuration to the terminal through the first base station. It can be learned that the method proposed in the fourth aspect is also applicable to an eLTE-NR dual connectivity scenario.

According to a fifth aspect, an embodiment of this application provides a base station, serving as a master base station in an LTE-NR DC scenario, where the base station includes units/means configured to perform steps of the first aspect. In a possible implementation, the base station includes: a receiving unit, configured to receive a new radio packet data convergence protocol NR PDCP configuration and identification information of a data radio bearer DRB corresponding to the NR PDCP configuration from a secondary base station; and a sending unit, configured to send, to a terminal, the NR PDCP configuration and the identification information of the DRB that are received by the receiving unit, where the base station and the secondary base station are base stations of different RATs.

In the fifth aspect of this application, the units/means of the base station may further perform steps described in the possible implementations of the first aspect. For details, refer to the descriptions in the possible implementations of the first aspect. Details are not described herein.

According to a sixth aspect, an embodiment of this application further provides a base station, where the base station has functions of implementing actions of the master base station in the method of the first aspect, and the foregoing functions may be implemented by using hardware, or may be implemented by executing corresponding software by hardware. The hardware or the software includes one or more units corresponding to the foregoing functions. In a possible implementation, a structure of the base station includes a communications interface, where the communications interface is configured to support transmission/reception of data/information to/from a secondary base station. The base station may further include at least one storage element, where the at least one storage element is configured to store a program and data; and may further include at least one processing element (or chip), configured to execute the program in the at least one storage element, to implement the method provided in the first aspect.

According to a seventh aspect, an embodiment of this application provides a base station, serving as a secondary base station in an LTE-NR DC scenario, where the base station includes units/means configured to perform steps of the second aspect. In a possible implementation, the base station includes: a processing unit, configured to generate a new radio packet data convergence protocol NR PDCP configuration; and a sending unit, configured to send, to a master base station, the NR PDCP configuration and identification information of a data radio bearer DRB corresponding to the NR PDCP configuration, where the base station and the master base station are base stations of different RATs.

In the seventh aspect of this application, the units/means of the base station may further perform steps described in the possible implementations of the second aspect. For details, refer to the descriptions in the possible implementations of the second aspect. Details are not described herein.

According to an eighth aspect, an embodiment of this application further provides a base station, where the base station has functions of implementing actions of the secondary base station in the method of the second aspect, and the foregoing functions may be implemented by using hardware, or may be implemented by executing corresponding software by hardware. The hardware or the software includes one or more units corresponding to the foregoing functions. In a possible implementation, a structure of the base station includes a communications interface, where the communications interface is configured to support transmission/reception of data/information to/from a master base station. The base station may further include at least one storage element, where the at least one storage element is configured to store a program and data; and may further include at least one processing element (or chip), configured to execute the program in the at least one storage element, to implement the method provided in the second aspect.

According to a ninth aspect, an embodiment of this application provides a terminal, where the terminal includes units/means configured to perform steps of the third aspect. In a possible implementation, the terminal includes: a receiving unit, configured to receive a new radio packet data convergence protocol NR PDCP configuration and identification information of a data radio bearer DRB corresponding to the NR PDCP configuration from a master base station, where the NR PDCP configuration is a configuration generated by a secondary base station; and a processing unit, configured to perform PDCP layer configuration on the DRB based on the NR PDCP configuration and the identification information of the DRB.

In the ninth aspect of this application, the units/means of the terminal may further perform steps described in the possible implementations of the third aspect. For details, refer to the descriptions in the possible implementations of the third aspect. Details are not described herein.

According to a tenth aspect, an embodiment of this application provides a terminal, where the terminal has functions of implementing actions of the terminal in the method of the third aspect, and the foregoing functions may be implemented by using hardware, or may be implemented by executing corresponding software by hardware. The hardware or the software includes one or more units corresponding to the foregoing functions. In a possible implementation, a structure of the terminal includes a transceiver element, where the transceiver element is configured to support transmission/reception of data/information to/from a master base station and a secondary base station. The terminal may further include at least one storage element, where the at least one storage element is configured to store a program and data; and may further include at least one processing element (or chip), configured to execute the program in the at least one storage element, to implement the method provided in the third aspect.

According to an eleventh aspect, an embodiment of this application further provides a base station, serving as the first base station in the fourth aspect, where the base station includes units/means configured to perform steps of the fourth aspect.

According to a twelfth aspect, an embodiment of this application further provides a base station, where the base station has functions of implementing actions of the first base station in the method of the fourth aspect, and the foregoing functions may be implemented by using hardware, or may be implemented by executing corresponding software by hardware. The hardware or the software includes one or more units corresponding to the foregoing functions. In a possible implementation, a structure of the base station includes a communications interface, where the communications interface is configured to support transmission/reception of data/information to/from a terminal and a second base station. The base station may further include at least one storage element, where the at least one storage element is configured to store a program and data; and may further include at least one processing element (or chip), configured to execute the program in the at least one storage element, to implement the method provided in the fourth aspect.

According to a thirteenth aspect, an embodiment of this application provides a computer-readable storage medium, where the computer-readable storage medium stores an instruction, and when the instruction is run on a computer, the computer performs the information processing method described in any of the foregoing aspects.

According to a fourteenth aspect, an embodiment of this application provides a computer program product including an instruction, where when the instruction is run on a computer, the computer performs the information processing method in any of the foregoing aspects.

According to a fifteenth aspect, this application provides a communications apparatus, including at least one storage element and at least one processing element, where the at least one storage element is configured to store a program, and when the program is executed, the communications apparatus performs an operation of the terminal in the information processing method in any one of the foregoing aspects. The apparatus may be a terminal chip.

According to a sixteenth aspect, this application provides a communications apparatus, including at least one storage element and at least one processing element. The at least one storage element is configured to store a program, and when the program is executed, the communications apparatus performs an operation of the base station (master base station or secondary base station) in the information processing method in any one of the foregoing aspects. The apparatus may be a base station chip.

According to a seventeenth aspect, an embodiment of this application provides a communications system, including the master base station and the secondary base station described in the foregoing aspects, where the communications system may further include the terminal in any one of the foregoing aspects.

It can be learned from the foregoing technical solutions that the embodiments of this application propose the solution about how the terminal obtains the NR PDCP configuration in the LTE-NR DC scenario.

BRIEF DESCRIPTION OF DRAWINGS

To describe the technical solutions in the embodiments of this application more clearly, the following briefly describes accompanying drawings used in the description of the embodiments.

FIG. 6 is a schematic structural diagram of an NR PDCP configuration in an RRC reconfiguration message according to an embodiment of this application;

FIG. 7 is another schematic structural diagram of an NR PDCP configuration in an RRC reconfiguration message according to an embodiment of this application;

FIG. 10 is another schematic transmission diagram of identification information of a DRB and an NR PDCP configuration according to an embodiment of this application;

FIG. 11 is another schematic transmission diagram of identification information of a DRB and an NR PDCP configuration according to an embodiment of this application;

FIG. 12 is a schematic flowchart of an embodiment of an information processing method according to an embodiment of this application:

DESCRIPTION OF EMBODIMENTS

The embodiments of this application provide an information processing method, a base station, and a terminal.

In the specification, claims, and accompanying drawings of this application, the terms "first", "second", "third", "fourth", and so on (if any) are intended to distinguish between similar objects but do not necessarily indicate a specific order or sequence. It should be understood that the terms used in such a way are interchangeable in appropriate circumstances so that the embodiments described herein can be implemented in other orders than the order illustrated or described herein. Moreover, the terms "include" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
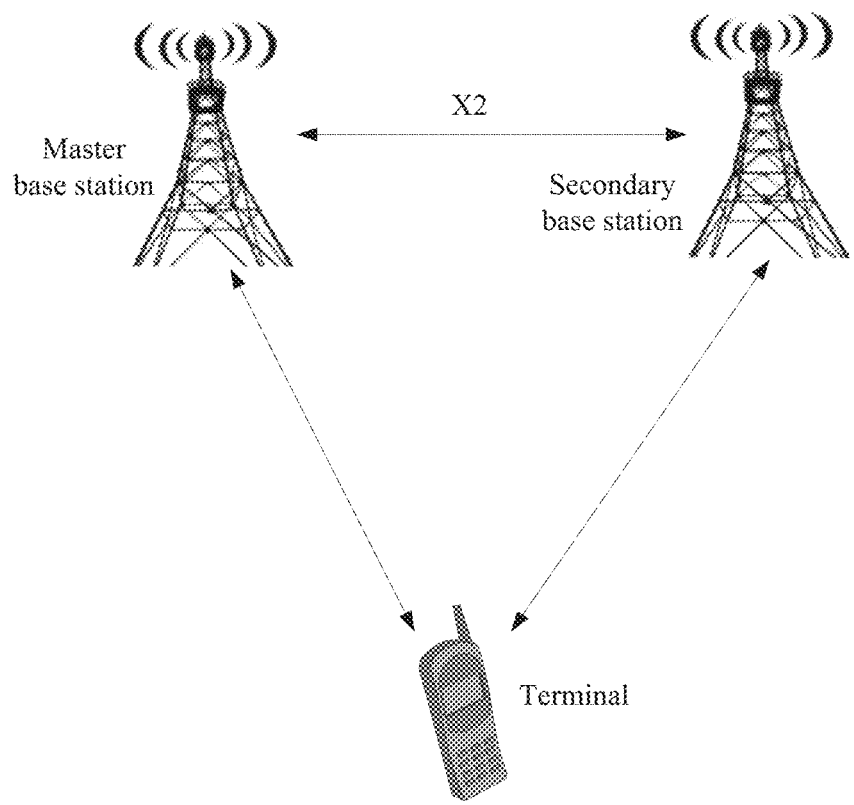
FIG. 1 is a schematic structural diagram of a dual-connectivity network system to which an embodiment of this application is applicable.

The embodiments of this application are applicable to a dual-connectivity scenario of an LTE system and an NR system, and are also applicable to a dual-connectivity scenario of another LTE system and the NR system, for example, including but not limited to a dual-connectivity scenario of an LTE-A (LTE-Advanced) system, or an LTE-U system, or an LTE-licensed assisted access (LAA) system and the NR system. For example, the embodiments of this application are applicable to LTE-NR dual connectivity (e-utran nr dual connectivity, EN-DC) in which an LTE base station serves as a master base station and an NR base station serves as a secondary base station. This is not specifically limited herein. FIG. 1 is a schematic structural diagram of a dual-connectivity network system to which an embodiment of this application is applicable. The dual-connectivity network system includes a master base station, a secondary base station, and a terminal. The terminal accesses both the master base station and the secondary base station. The master base station and the secondary base station are connected via a communications interface such as an Xn or X2 interface. It should be noted that for ease of understanding, the following description is based on an example in which the communications interface between the master base station and the secondary base station is the X2 interface. The master base station is mainly responsible for a control function and data transmission, and the secondary base station is mainly used for data splitting. In this embodiment of this application, an evolved NodeB (eNB or eNodeB) in the LTE system may be used as the master base station (referred to as an MeNB), and a gNodeB (gNB) in the NR system may be used as the secondary base station (referred to as an SgNB). Alternatively, a gNodeB (gNB) in the NR system is used as the master base station, and an eNB in the LTE system is used as the secondary base station. This is not limited herein. In addition, when the master base station is the eNB, the master base station may be connected to an evolved packet core (EPC) or an NR core network. When the eNB serving as the master base station is connected to the NR core network, the eNB is an eLTE eNB. The master base station may also be referred to as a master node (MN), and the secondary base station may also be referred to as a secondary node (SN).

The terminal described in this embodiment of this application may be a wireless terminal that provides a user with voice and/or data connectivity, a handheld device with a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone), and a computer with a mobile terminal, for example, may be a portable, pocket-sized, handheld, computer built-in, or in-vehicle mobile apparatus, which exchanges voice and/or data with the radio access network. The wireless terminal may be, for example, a personal communications service (PCS) phone, a cordless phone, a session initiation protocol (SIP) phone set, a wireless local loop (WLL) station, or a personal digital assistant (PDA). The wireless terminal may also be referred to as a system, a subscriber unit, a subscriber station, a mobile station, a mobile console, a remote station, an access point, a remote terminal, an access terminal, a user terminal, a user agent, a user device, or user equipment (UE). This is not specifically limited herein.

Figure 2:
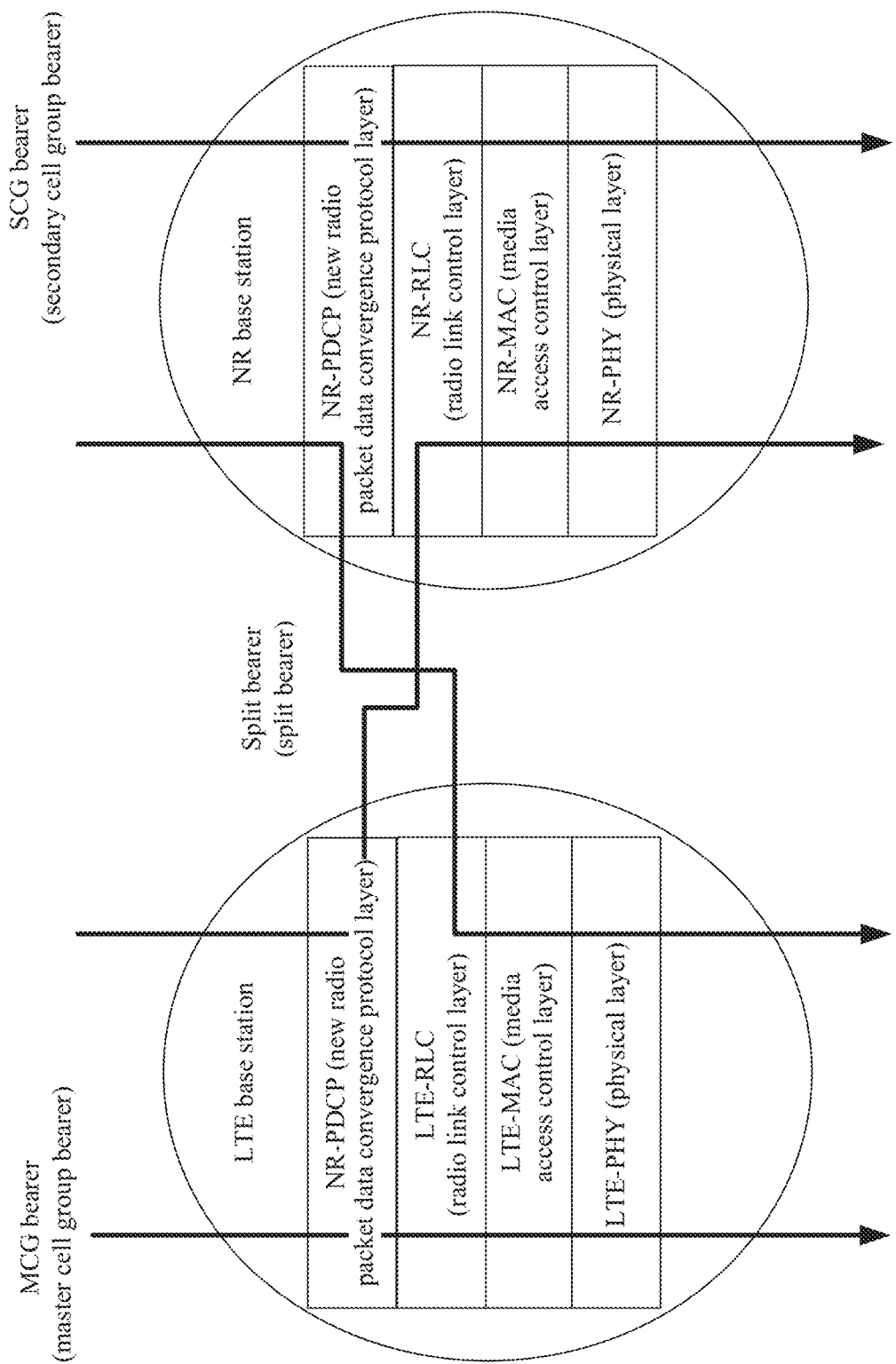
FIG. 2 is a schematic diagram of a DRB according to an embodiment of this application.

In this embodiment of this application, a DRB is a data radio bearer between a terminal and a base station, and is used to carry data transmitted between the base station and the terminal. FIG. 2 is a schematic diagram of a DRB according to an embodiment of this application. It can be learned from FIG. 2 that DRB types provided in this embodiment of this application include a master cell group bearer (MCG bearer), a secondary cell group bearer (SCG bearer), and a split bearer. Split bearers further include a split bearer whose data anchor is on a master base station and a split bearer those data anchor is on a secondary base station. The split bearer whose data anchor is on the master base station may be referred to as a master cell group split bearer (MCG split bearer), and the split bearer whose data anchor is on the secondary base station may be referred to as a secondary cell group split bearer (SCG split bearer).

Specifically, the MCG bearer is a bearer whose air interface protocol is only in the master base station for using a transmission resource of the master base station, and therefore uplink or downlink data on the MCG bearer is transmitted only through the master base station. The SCG bearer is a bearer whose air interface protocol is only in the secondary base station for using a transmission resource of the secondary base station, and therefore uplink or downlink data on the SCG bearer is transmitted only through the secondary base station. The split bearer is a bearer whose air interface protocol is in both the master base station and the secondary base station for using transmission resources of both the master base station and the secondary base station, so that the master base station and the secondary base station can simultaneously perform data transmission with a terminal. Further, for the split bearer, if the MCG split bearer is used, in a downlink direction, a packet data convergence protocol (PDCP) layer of the master base station splits downlink data delivered by a core network and sends split downlink data to the secondary base station, and the secondary base station sends the split downlink data to the terminal; and in an uplink direction, if uplink split is supported, both the master base station and the secondary base station receive uplink data from the terminal, the secondary base station then sends the received uplink data to the master base station, and the master base station reorders the uplink data received by the master base station and the uplink data received from the secondary base station, and then sends the received data to the core network in sequence. If the SCG split bearer is used, in a downlink direction, a PDCP layer of the secondary base station splits downlink data delivered by the core network and sends split downlink data to the master base station, and the master base station sends the split downlink data to the terminal; and in an uplink direction, if uplink split is supported, both the master base station and the secondary base station receive uplink data from the terminal, the master base station then sends the received uplink data to the secondary base station, and the secondary base station reorders the uplink data received from the master base station and the uplink data received by the secondary base station, and then sends the received data to the core network in sequence. It can be understood that, for the MCG bearer and the SCG bearer, data transferred via the master base station and data transferred via the secondary base station belong to different services, for example, voice service data is transferred via the master base station, and video service data is transferred via the secondary base station; for the split bearer, data transferred via the master base station and data transferred via the secondary base station are different data of a same type of service. This is not limited in this embodiment of this application.

For example, in this embodiment of this application, a PDCP layer of the MCG bearer, a PDCP layer of the SCG bearer, and a PDCP layer of the split bearer may all use a format of a PDCP layer specified in an NR protocol. In this embodiment of this application, the PDCP layer specified in the NR protocol may be referred to as an NR PDCP layer. For other protocol layers such as a radio link control (RLC) layer, a media access control (MAC) layer, and a physical layer (PHY), the foregoing four types of bearers are independent of each other in different RATs.

In the foregoing scenario, a configuration corresponding to each DRB includes configuration information of the NR PDCP layer, which is referred to as an NR PDCP configuration in this embodiment of this application. The NR PDCP configuration has a one-to-one correspondence with the DRB, and different DRBs are corresponding to different NR PDCP configurations. For example, if the DRB is an MCG bearer, and the MCG bearer is corresponding to one NR PDCP configuration, the NR PDCP configuration corresponding to the MCG bearer may include, but is not limited to, the following information:

1. Duration setting of a discard timer, used to configure an NR PDCP layer of the terminal to determine when to delete a PDCP service data unit (SDU) buffered in a buffer at the NR PDCP layer and a PDCP protocol data unit (PDU) corresponding to the PDCP SDU;

2. Header compression parameter, used to indicate header compression profile information used when a data packet is transmitted between the master base station and the terminal:

3. Duration setting of a reordering timer (t-reordering), used to indicate a timer used for performing a reordering operation at the NR PDCP layer of the terminal:

4. Status report information, used to indicate whether the terminal enables an NR PDCP status report function in an RLC acknowledge mode (AM); and 5. Length indicator of a PDCP serial number (SN).

It should be noted that the foregoing NR PDCP configuration is merely an example, and does not intend to limit the NR PDCP configuration described in this application. The NR PDCP configuration may include other configuration information/parameters depending on an actual application scenario.

Figure 3:
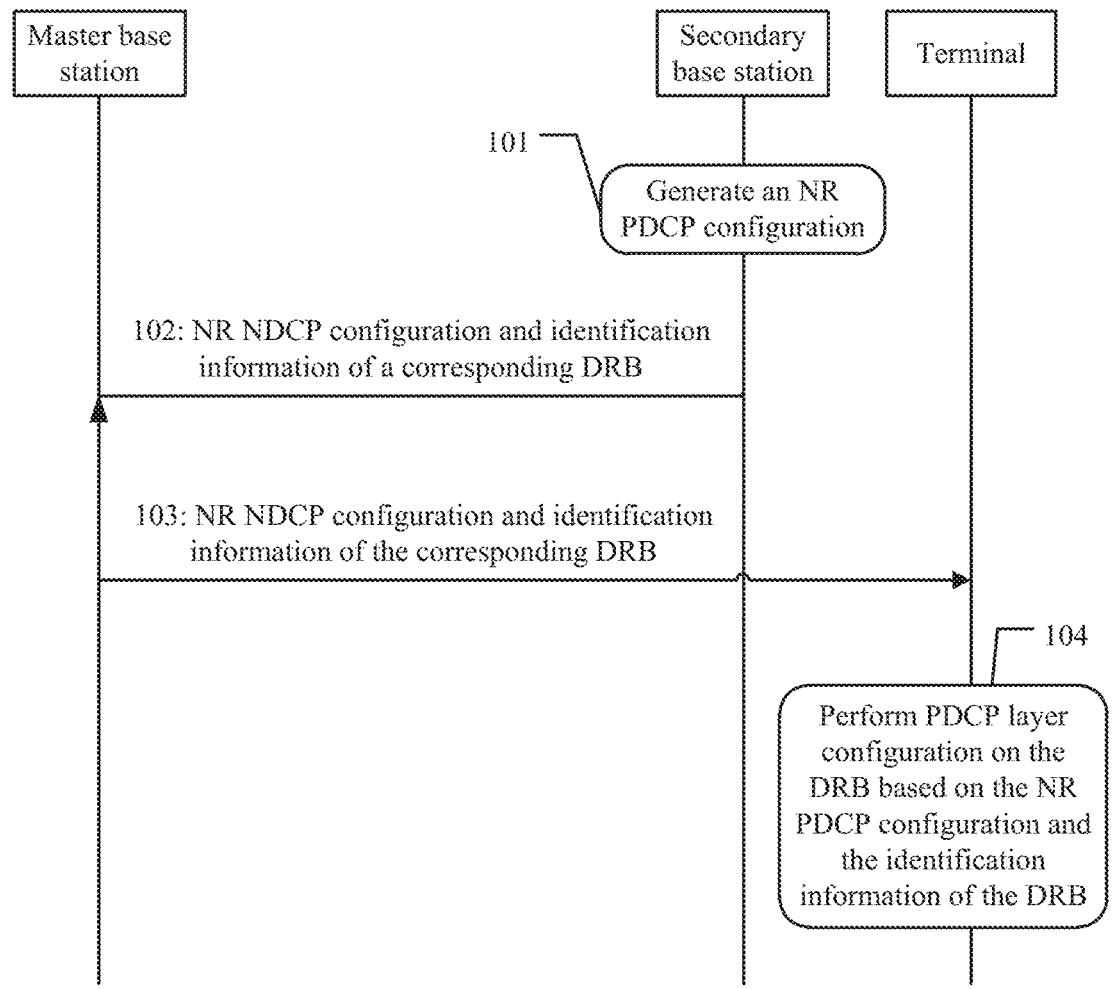
FIG. 3 is a schematic signaling exchange diagram of an embodiment of an information processing method according to an embodiment of this application.

FIG. 3 is a schematic signaling exchange diagram of an embodiment of an information processing method according to an embodiment of this application. The method includes the following steps.

101: A secondary base station generates an NR PDCP configuration.

Further, the secondary base station sends, to a master base station, the NR PDCP configuration and identification information of a DRB corresponding to the NR PDCP configuration.

There is a one-to-one mapping relationship between the NR PDCP configuration and the DRB. The NR PDCP configuration may be an NR PDCP configuration corresponding to either or both of an SCG bearer and an SCG split bearer.

In this implementation, the secondary base station separately generates the NR PDCP configuration, where there is a one-to-one mapping relationship between the NR PDCP configuration and the DRB.

102: The master base station receives the NR PDCP configuration and the identification information of the DRB corresponding to the NR PDCP configuration from the secondary base station.

The identification information of the DRB may be a DRB identity (DRB ID), or other information that may be used to identify the DRB. Specifically, the identification information may be in a form of a string and/or a number. This is not particularly limited in this embodiment of this application. It can be understood that different DRBs can be distinguished by different identification information.

In some implementations of this application, the secondary base station may send the NR PDCP configuration and the identification information of the DRB corresponding to the NR PDCP configuration to the master base station in a plurality of manners via a logical interface between the secondary base station and the master base station, for example, an X2 interface. For ease of understanding, an example in which an eNB serves as the master base station (MeNB) and a gNB serves as the secondary base station (SgNB) is used for description herein.

Figure 4:
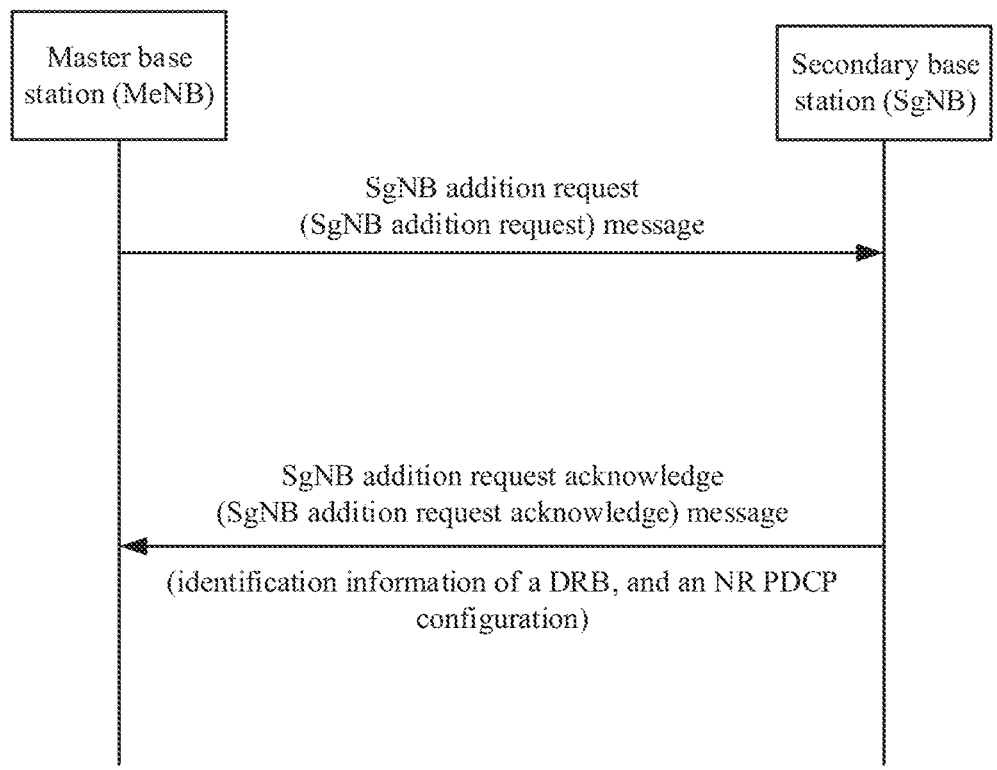
FIG. 4 is a schematic transmission diagram of identification information of a DRB and an NR PDCP configuration according to an embodiment of this application.

Example manner 1: As shown in FIG. 4, for example, in an EN-DC scenario, when the MeNB determines that a bearer (for example, an SCG bearer and/or an SCG split bearer) needs to be established on the SgNB, the MeNB sends an SgNB addition request message to the SgNB via the X2 interface between the MeNB and the SgNB. After receiving the SgNB addition request message, the SgNB feeds back a corresponding SgNB addition request acknowledge message to the MeNB, where the SgNB addition request acknowledge message includes a parameter related to the DRB established on the SgNB. In this embodiment of this application, the SgNB adds the mapping relationship between the NR PDCP configuration and the DRB into the SgNB addition request acknowledge message. That is, in this embodiment of this application, the SgNB may send the generated mapping relationship between the NR PDCP configuration and the DRB to the master base station by using the SgNB addition request acknowledge message.

Figure 5:
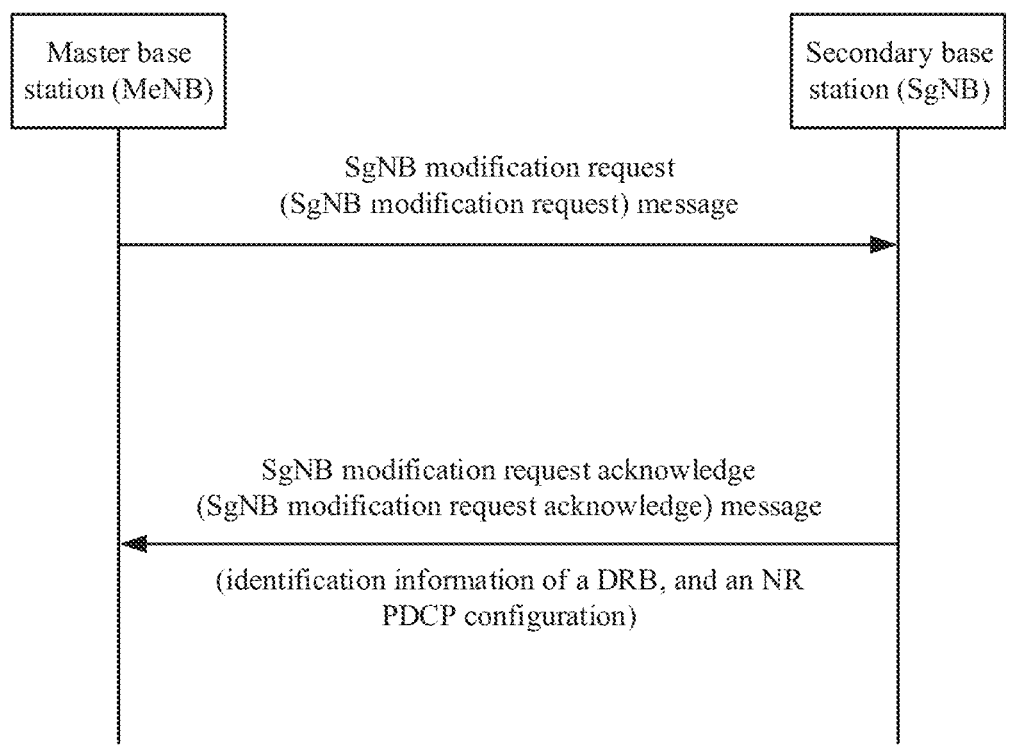
FIG. 5 is another schematic transmission diagram of identification information of a DRB and an NR PDCP configuration according to an embodiment of this application.

Example manner 2: As shown in FIG. 5, the SgNB may alternatively send the NR PDCP configuration and the identification information of the DRB corresponding to the NR PDCP configuration to the MeNB by using an SgNB modification request acknowledge message. To be specific, the SgNB adds the NR PDCP configuration and the identification information of the DRB corresponding to the NR PDCP configuration into the SgNB modification request acknowledge message and sends the message to the MeNB. The SgNB modification request acknowledge message is a message fed back by the secondary base station after the secondary base station receives an SgNB modification request message.

It should be noted that, the mapping relationship between the NR PDCP configuration and the DRB may be sent to the master base station by using the SgNB addition request acknowledge message or the SgNB modification request acknowledge message. In addition, the NR PDCP configuration and the identification information of the DRB may be sent to the master base station by using an SgNB modification required message, an SgNB change required message, or another message sent by the secondary base station to the master base station. This is not limited in this embodiment of this application.

It should be understood that when a terminal establishes a DRB with the base station, the terminal first establishes a bearer between the terminal and a core network device. For example, in the EN-DC scenario, the bearer may be an evolved packet system (EPS) bearer. The terminal establishes an EPS bearer with a packet data network gateway (PDN-GW), where the EPS bearer includes a DRB, one EPS bearer of the terminal may be corresponding to one DRB, and an EPS bearer identity (EPS ID) is used to identify the EPS bearer of the terminal. That is, an NR PDCP configuration corresponding to each DRB is also corresponding to one EPS bearer. However, if the secondary base station is an NR SgNB, the secondary base station cannot identify the EPS bearer. Therefore, the secondary base station does not send a mapping relationship between the NR PDCP configuration and the EPS bearer to the master base station. To enable the master base station to learn of a bearer to which a received NR PDCP configuration is corresponding, this embodiment of this application provides a manner for sending the EPS ID to the master base station by the secondary base station.

103: The master base station sends the NR PDCP configuration and the identification information of the DRB corresponding to the NR PDCP configuration to the terminal. In this embodiment of this application, after learning of the NR PDCP configuration and the identification information of the DRB corresponding to the NR PDCP configuration that are sent by the secondary base station, the master base station notifies the terminal of the NR PDCP configuration and the identification information of the DRB corresponding to the NR PDCP configuration. When the master base station and the secondary base station are base stations of different RATs, the master base station directly forwards, to the terminal, the relationship between the NR PDCP configuration and the DRB that is sent by the secondary base station, without parsing the NR PDCP configuration generated by the secondary base station. This effectively resolves a problem that the secondary base station sends the NR PDCP configuration to the terminal.

104: The terminal performs PDCP layer configuration on the DRB based on the NR PDCP configuration and the identification information of the DRB.

After the terminal receives the NR PDCP configuration and the identification information of the DRB corresponding to the NR PDCP configuration, the terminal may determine, by using the identification information of the DRB, the NR PDCP configuration corresponding to the established DRB, and perform PDCP layer configuration on the DRB by using the NR PDCP configuration, so as to ensure normal transmission of data on the DRB.

In some implementations of this application, that the master base station receives the NR PDCP configuration and the identification information of the DRB corresponding to the NR PDCP configuration from the secondary base station includes:

The master base station receives a first container and the identification information of the DRB from the secondary base station, where the first container includes only the NR PDCP configuration; and the first container has a one-to-one correspondence with the identification information of the DRB. The secondary base station generates, in a form of a container, the first container including only the NR PDCP configuration, and sends the first container to the master base station.

It should be noted that the first container includes only the NR PDCP configuration generated by the secondary base station, and this can be understood as: The secondary base station sets an independent first container for the NR PDCP configuration generated by the secondary base station, and the first container is different from a container that encapsulates other information.

It should be understood that, for an LTE-NR DC scenario, because the master base station and the secondary base station use different radio access technologies (RAT), the master base station cannot recognize the NR PDCP configuration generated by the secondary base station. If the secondary base station directly sends the generated NR PDCP configuration to the master base station, the master base station may consider the NR PDCP configuration sent by the secondary base station as an error packet, and therefore perform other processing such as an RRC reconnection. According to this embodiment of this application, the secondary base station generates, in the form of a container, the first container including the NR PDCP configuration, and sends the first container including only the NR PDCP configuration to the master base station. In this case, the master base station does not need to parse content of the first container, but transparently transmits the first container to the terminal directly for parsing. Therefore, the master base station does not consider the first container as an error packet or perform other processing. This can effectively reduce unnecessary system overheads.

With reference to the foregoing embodiment, that the master base station sends the NR PDCP configuration and the identification information of the DRB to the terminal includes:

The master base station sends the identification information of the DRB and the first container including only the NR PDCP configuration to the terminal.

To be specific, after receiving the first container and the identification information of the DRB that are sent by the secondary base station, the master base station sends the first container and the identification information of the DRB to the terminal.

After the secondary base station encapsulates the generated NR PDCP configuration into a container, sends the container to the master base station, and sends the identification information of the DRB corresponding to the first container to the master base station, the master base station sends the identification information of the DRB corresponding to the first container to the terminal, and directly forwards the first container to the terminal in a transparent transmission mode, so that the terminal can obtain, based on the first container, the NR PDCP configuration generated by the secondary base station, and determine, based on the received identification information, the DRB corresponding to the NR PDCP configuration. In this way, the secondary base station successfully sends the NR PDCP configuration to the terminal.

In some implementations of this application, that the master base station receives the NR PDCP configuration and the identification information of the DRB corresponding to the NR PDCP configuration from the secondary base station includes:

The master base station receives a first container including only the NR PDCP configuration and the identification information of the DRB from the secondary base station, where the NR PDCP configuration has a one-to-one correspondence with the identification information of the DRB. It can be learned that in this implementation, the secondary base station encapsulates the generated NR PDCP configuration and the identification information of the DRB into the container, and sends the container to the master base station, that is, the secondary base station encapsulates the generated NR PDCP configuration together with the identification information of the DRB corresponding to the NR PDCP configuration into the container and sends the container to the master base station. Similarly, the master base station does not need to parse content of the first container, does not consider the received first container as an error packet, and therefore does not perform other processing. This can also effectively reduce unnecessary system overheads.

With reference to the foregoing embodiment, that the master base station sends the NR PDCP configuration and the identification information of the DRB to the terminal includes: The master base station sends the first container to the terminal.

After the secondary base station encapsulates the generated NR PDCP configuration together with the identification information of the DRB corresponding to the NR PDCP configuration into the first container and sends the first container to the master base station, the master base station directly forwards the first container to the terminal in the transparent transmission mode, so that the terminal can obtain, based on the first container, the NR PDCP configuration generated by the secondary base station, and the identification information of the DRB corresponding to the NR PDCP configuration. In this way, the secondary base station successfully sends the NR PDCP configuration to the terminal.

In this embodiment of this application, after an RRC connection is established between the master base station and the terminal, the master base station triggers an RRC connection reconfiguration procedure. For example, when an air interface configuration needs to be sent to the terminal, the master base station sends an RRC reconfiguration message to the terminal, where the RRC reconfiguration message includes various information element parameters with different functions. Herein, an actual example is used for description. For example, it is assumed that a bearer whose data anchor is on the secondary base station (SCG split bearer) is corresponding to a DRB ID 1. When the secondary base station receives, from the master base station, a request for establishing the bearer, the secondary base station generates a corresponding NR PDCP configuration based on the DRB ID 1 of the DRB requested by the master base station, encapsulates only the NR PDCP configuration into a container 1, and sends the container 1 together with the corresponding identification information of the DRB ID 1 to the master base station. The master base station adds the container 1 and the identification information of the DRB ID 1 corresponding to the container 1 that are received from the secondary base station into the RRC reconfiguration message in a form of an IE parameter, and sends the DRB ID 1 and the NR PDCP configuration corresponding to the DRB ID 1 to the terminal by using the RRC reconfiguration message. Specifically, there are two example manners for sending a DRB ID and an NR PDCP configuration corresponding to the DRB ID to the terminal by using an RRC reconfiguration message.

Example manner 1: Forms of the NR PDCP configuration and the identification information of the DRB in the RRC reconfiguration message may be shown in FIG. 6.

As shown in FIG. 6, in this embodiment of this application, the RRC reconfiguration message sent by the master base station to the terminal includes an IE, where the IE may be in a form of a list, and the list may be a common packet data convergence protocol list (referred to as "CommonPDCPConfigList" in this embodiment of this application). Each item in the list includes a container corresponding to the NR PDCP configuration, and identification information (DRB ID) of a DRB corresponding to the container. Different containers are corresponding to different DRB IDs, and different DRBs have different DRB IDs. For ease of understanding of a mapping relationship between a DRB ID and a container, an actual example is used for description herein. For example, for an MCG bearer, a PDCP layer is on the master base station. After the MCG bearer is configured for the master base station, the master base station generates, in a form of a container, an NR PDCP configuration corresponding to the MCG bearer, and uses the container and a corresponding DRB ID as an item in the list. Similarly, for an MCG split bearer, a processing manner is exactly the same as that of the MCG bearer. For an SCG bearer, a PDCP layer is on the secondary base station. After the SCG bearer is configured for the secondary base station, the secondary base station generates, in a form of a container, an NR PDCP configuration corresponding to the bearer, and sends the container and a corresponding DRB ID to the master base station. The master base station uses the container and the corresponding DRB ID that are received from the secondary base station as an item in the list. Similarly, for an SCG split bearer, a processing manner is exactly the same as that of the SCG bearer.

It can be learned that this embodiment of this application proposes a specific implementation of configuring the NR PDCP configuration and the DRB ID in the RRC reconfiguration message.

It should be noted that in this embodiment of this application, there is another manner: The RRC reconfiguration message sent by the master base station to the terminal includes a common packet data convergence protocol list, where each item in the list includes one container, and the container includes only a DRB ID and an NR PDCP configuration corresponding to the DRB ID.

Example manner 2: Forms of the NR PDCP configuration and the identification information of the DRB in the RRC reconfiguration message may be shown in FIG. 7.

As shown in FIG. 7, in this embodiment of this application, a "CommonPDCPConfigList" IE is also defined in the RRC reconfiguration message sent by the master base station to the terminal, but there is a difference between a manner shown in FIG. 7 and that shown in FIG. 6: The CommonPDCPConfigList shown in FIG. 7 is targeted only for a split bearer, where each item in the list may include a container corresponding to one NR PDCP configuration and a corresponding DRB ID; or each item in the list may include one container, and the container includes only an NR PDCP configuration and a corresponding DRB ID.

For an MCG bearer and an SCG bearer, locations of IEs of NR PDCP configurations corresponding to the MCG bearer and the SCG bearer are unchanged. As shown in FIG. 7, a container corresponding to the MCG bearer is configured in a "DBR-ToAddMod" IE carried in the RRC reconfiguration message, and a container corresponding to the SCG bearer is configured in a "DBR-ToAddModListSCG" IE carried in the RRC reconfiguration message. Only an original PDCP configuration parameter is replaced by a container, where the container includes the NR PDCP configuration corresponding to the MCG bearer and/or the SCG bearer. Therefore, this embodiment of this application proposes another specific manner of configuring the NR PDCP configuration and the DRB ID in the RRC reconfiguration message.

In an implementation of this application, the terminal performs PDCP layer processing on data on the DRB based on the obtained NR PDCP configuration and the obtained identification information of the DRB. For details, refer to the following descriptions.

For uplink data transmission, that the terminal performs PDCP layer processing on sent data includes: performing corresponding header compression on the sent data; performing encryption/integrity protection on user plane data and control plane data that are transmitted in uplink; and performing processing such as integrity protection on the control plane data. For downlink data transmission, that the terminal performs PDCP layer processing on received data includes: performing corresponding decompression on the received data; performing decryption/integrity check on user plane data and control plane data that are transmitted in downlink; and performing processing such as integrity check on the control plane data. It should be noted that in a specific processing process of the NR PDCP layer, corresponding NR PDCP layer processing performed by the terminal is determined based on an NR PDCP configuration corresponding to an actual DRB type, which is not specifically limited herein. Detailed description is provided in the next embodiment.

It should be noted that in actual application, configuration information of an air interface corresponding to the DRB includes: a PDCP configuration, an RLC configuration, a MAC configuration, a logical channel configuration, and the like. In some implementations of this application, the secondary base station not only generates an independent first container for the NR PDCP configuration, but also generates an independent second container for other air interface configurations of the secondary base station, for example, the RLC configuration, the MAC configuration, and the logical channel configuration. The secondary base station not only sends the first container and the corresponding DRB ID to the master base station, but also may send the second container and a corresponding DRB ID to the master base station. The master base station sends, to the terminal, the first container and the DRB ID that are received from the secondary base station. In addition, the master base station also sends, to the terminal, the second container and the DRB ID that are received from the secondary base station.

There is still another implementation solution in this embodiment. The secondary base station generates an independent first container for the NR PDCP configuration and the corresponding DRB ID. The secondary base station also generates an independent second container for other air interface configurations of the secondary base station, such as the RLC configuration, the MAC configuration, and the logical channel configuration, and the corresponding DRB ID. The secondary base station sends the first container and the second container to the master base station. The master base station sends, to the terminal, the first container and the second container that are received from the secondary base station.

Figure 8:
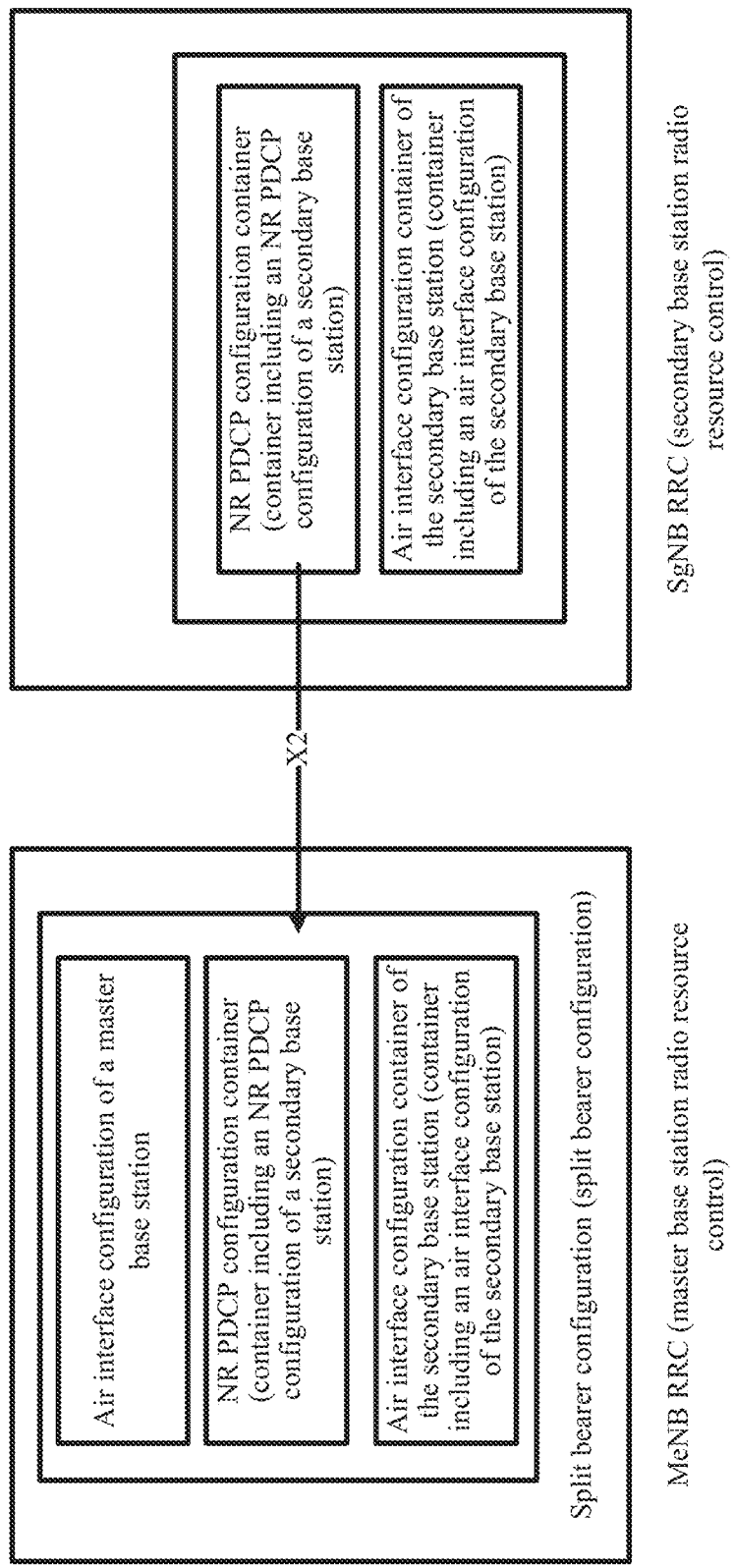
FIG. 8 is a schematic transmission diagram of an embodiment of an information processing method according to an embodiment of this application.

As shown in FIG. 8, the SCG split bearer is used as an example. It is assumed that the SCG split bearer is corresponding to a DRB ID 1. The secondary base station generates, based on the DRB ID 1, an NR PDCP configuration corresponding to the DRB ID 1, and encapsulates the NR PDCP configuration into a container (referred to as an NR PDCP configuration container in this embodiment of this application). In addition, the secondary base station also generates air interface configurations of the secondary base station based on the DRB ID 1, where the air interface configurations of the secondary base station include an RLC configuration, a MAC configuration, a logical channel configuration, and the like, and these configurations are encapsulated into another container (referred to as an air interface configuration container of the secondary base station in this embodiment of this application). The secondary base station sends the NR PDCP configuration container, the air interface configuration container of the secondary base station, and the DRB ID 1 together to the master base station.

The master base station correspondingly generates air interface configurations of the master base station based on the DRB ID 1, where the air interface configurations of the master base station include an RLC configuration, a MAC configuration, and a logical channel configuration of the master base station. The master base station sends the DRB ID 1, the NR PDCP configuration container, the air interface configuration container of the secondary base station, and the air interface configurations of the master base station to the terminal.

There is still another implementation in this embodiment. The secondary base station generates, based on the DRB ID 1, an NR PDCP configuration corresponding to the DRB ID 1, and encapsulates both the NR PDCP configuration and the DRB ID 1 into a container (referred to as an NR PDCP configuration container in this embodiment of this application). In addition, the secondary base station also generates air interface configurations of the secondary base station based on the DRB ID 1, where the air interface configurations of the secondary base station include an RLC configuration, a MAC configuration, a logical channel configuration, and the like of the secondary base station, and these configurations and the DRB ID 1 are encapsulated into another container (referred to as an air interface configuration container of the secondary base station in this embodiment of this application). The secondary base station sends the NR PDCP configuration container and the air interface configuration container of the secondary base station together to the master base station.

The master base station correspondingly generates air interface configurations of the master base station based on the DRB ID 1, where the air interface configurations of the master base station include the DRB ID 1 and an RLC configuration, a MAC configuration, and a logical channel configuration of the master base station. The master base station sends the NR PDCP configuration container, the air interface configuration container of the secondary base station, and the air interface configurations of the master base station to the terminal.

Configuration processes of the SCG bearer, the MCG split bearer, and the MCG bearer are similar to the configuration process of the SCG split bearer, and details are not described herein.

Figure 9:
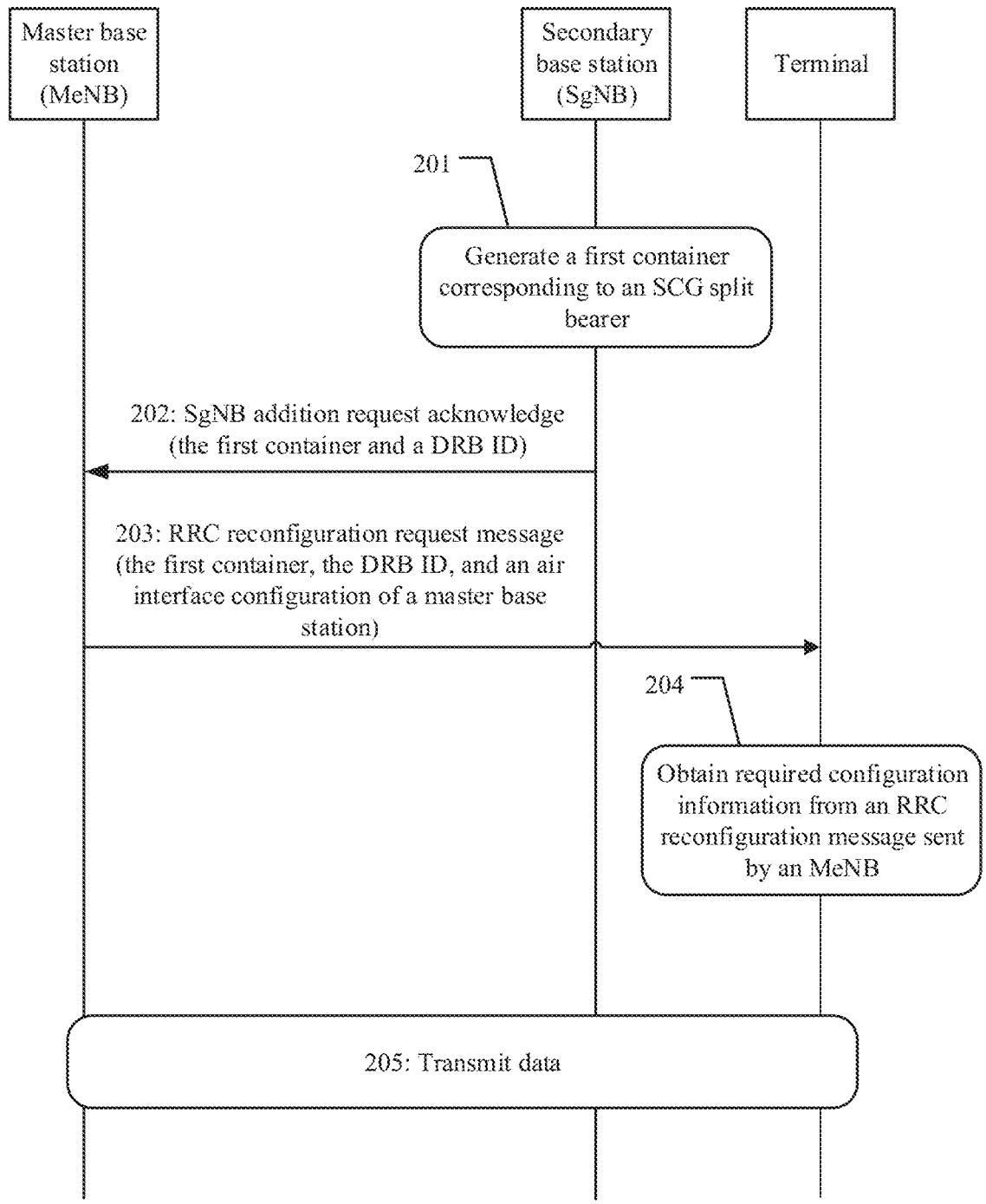
FIG. 9 is a schematic signaling exchange diagram of another embodiment of an information processing method according to an embodiment of this application.

For ease of understanding of implementation of this application, an embodiment of this application is described herein by using an example in which an SCG split bearer is used for downlink transmission of video service data in an EN-DC dual-connectivity scenario. FIG. 9 is another schematic flowchart of an embodiment of an information processing method according to an embodiment of this application. The method includes the following steps.

201: An SgNB generates a first container corresponding to an SCG split bearer.

In this implementation, the SgNB separately generates an NR PDCP configuration corresponding to the SCG split bearer, there is a one-to-one mapping relationship between the NR PDCP configuration and a DRB, and there is also a one-to-one mapping relationship between SgNB air interface configurations and the DRB.

Optionally, the SgNB generates SgNB air interface configurations, where the SgNB air interface configurations include an RLC configuration, a MAC configuration, a logical channel configuration, and the like; and the SgNB encapsulates the SgNB air interface configurations into a second container. It can be understood that the second container and the first container are two independent containers. To be specific, the first container includes the NR PDCP configuration corresponding to the SCG split bearer, and the second container includes the SgNB air interface configurations. The second container may be referred to as an SgNB air interface configuration container.

The NR PDCP configuration may include one or more of the following information:

1. Duration setting of a discardTimer, used to configure an NR PDCP layer of a terminal to determine when to delete a PDCP SDU buffered in a buffer at the NR PDCP layer and a PDCP PDU corresponding to the PDCP SDU;

2. Header compression parameter, used to indicate header compression profile information used when a data packet is transmitted between an MeNB and the terminal;

3. Duration setting of t-reordering, used to indicate a timer used for performing a reordering operation at the NR PDCP layer of the terminal:

4. Status report information, used to indicate whether the terminal enables an NR PDCP status report function in an RLC acknowledge mode (AM); and 5. Length indicator of a PDCP SN.

In other words, after the SCG split bearer is established, related configuration information used for transmitting data on the SCG split bearer needs to be determined.

202: The SgNB sends the generated first container and a DRB ID to the MeNB by using an SgNB addition request acknowledge message.

Optionally, the SgNB addition request acknowledge message further includes the second container. Specifically, as shown in FIG. 10, the SgNB encapsulates the generated NR PDCP configuration into a container and sends the container to the MeNB. In addition, the SgNB encapsulates other air interface configuration information (configurations other than the NR PDCP configuration) such as the RLC configuration, the MAC configuration, and the logical channel configuration of the SgNB into another container, and sends the two containers and corresponding DRB IDs together to the MeNB in a same way.

In other words, in this embodiment of this application, the SgNB not only sends the mapping relationship between the generated NR PDCP configuration and the DRB to the MeNB by using an X2 interface message, but also may provide a mapping relationship between the SgNB air interface configuration generated by the SgNB and the DRB to the MeNB by using the X2 interface message. A specific providing process is similar to a process of providing the mapping relationship between the NR PDCP configuration generated by the SgNB and the DRB, and details are not described herein.

203: The MeNB sends, to the terminal via a Uu interface, the first container and the DRB ID that are received from the SgNB, and MeNB air interface configurations generated by the MeNB.

Optionally, when the MeNB receives the second container, the MeNB sends, to the terminal, the second container together with the first container, the DRB IDs, and the MeNB air interface configurations generated by the MeNB. Specifically, as shown in FIG. 11, after obtaining the first container, the second container, and the DRB IDs corresponding to the two containers from the SgNB, the MeNB sends them to the terminal by using an RRC reconfiguration message, where the RRC reconfiguration message further includes the air interface configurations of the MeNB.

204: The terminal obtains required configuration information from the RRC reconfiguration message sent by the MeNB.

After receiving the RRC reconfiguration message from the MeNB, the terminal may obtain the NR PDCP configuration of the SgNB, the SgNB air interface configuration, and the MeNB air interface configuration from the RRC reconfiguration message.

205: The terminal performs data transmission with both the MeNB and the SgNB.

Specifically, a core network sends video service data to the terminal via the SCG split bearer in downlink transmission, that is, the core network needs to send the video service data of the terminal to the SgNB, and the SgNB splits the video service data, so that some of the video service data is sent by the MeNB to the terminal, and some of the data is directly sent by the SgNB to the terminal. Before the core network transmits the video service data, the MeNB and the SgNB each need to establish a corresponding split bearer with the terminal. The established split bearer is assigned a corresponding DRB ID. Therefore, the terminal may determine, based on the DRB ID, configuration information related to Layer L2 (Layer 2) corresponding to the split bearer. Because the terminal has obtained a Layer L2 configuration sent by the MeNB in step 204, the terminal may receive, by using the Layer L2 configuration sent by the MeNB, the video service data transmitted by the core network in downlink.

It can be learned from the foregoing description that there is another implementation solution in this embodiment: The SgNB generates a first container and a second container that are corresponding to an SCG split bearer, where the first container includes only an NR PDCP configuration corresponding to the SCG split bearer and a corresponding DRB ID, and the second container includes SgNB air interface configurations corresponding to the SCG split bearer, such as an RLC configuration, a MAC configuration, and a logical channel configuration of the SgNB, and a corresponding DRB ID. The SgNB sends the first container and the second container to the MeNB via an X2 interface. The MeNB sends the two containers received from the SgNB, and MeNB air interface configurations generated by the MeNB to a terminal via a Uu interface.

FIG. 12 is a schematic flowchart of an embodiment of an information processing method according to an embodiment of this application. The method includes the following steps.

301: A base station determines that a terminal supports the NR PDCP protocol or that a terminal supports an LTE-NR dual-connectivity function.

In this embodiment of this application, there are mainly three scenarios in which the base station determines that the terminal supports the NR PDCP protocol or that the terminal supports the LTE-NR dual-connectivity function. Details are as follows:

In a first scenario, when the terminal initially accesses the base station, the terminal triggers an attach procedure, where the attach procedure includes a process of reporting capability information to a core network device by the terminal. Specifically, the terminal sends the capability information to the base station accessed by the terminal, and the base station stores the capability information reported by the terminal into the core network device. It can be learned that when the terminal initially accesses the base station, the base station may learn of the capability information of the terminal, and if the capability information of the terminal indicates that the terminal supports the NR PDCP protocol or that the terminal supports the LTE-NR dual-connectivity function, the base station sends an NR PDCP configuration to the terminal after the base station determines, based on the received capability information of the terminal, that the terminal supports the NR PDCP protocol or that the terminal supports the LTE-NR dual-connectivity function.

In a second scenario, when the terminal that has accessed the base station enters active mode from idle mode, the base station receives capability information of the terminal from the core network device, and determines, based on the capability information of the terminal, that the terminal supports the NR PDCP protocol or that the terminal supports the LTE-NR dual-connectivity function.

When the terminal that has accessed the base station enters idle mode, to reduce system load, the base station clears information related to the terminal, including the capability information of the terminal. However, the terminal has reported the capability information of the terminal to the core network device when the terminal initially accesses the base station, in other words, the core network device stores the capability information reported by the terminal. Therefore, when the terminal that has accessed the base station enters active mode from idle mode, the base station can obtain the capability information of the terminal from the core network device. For example, in some implementations of this application, when the terminal that has accessed the base station enters active mode from idle mode, the core network device sends related information of the terminal to the terminal by using an initial context setup request (S1) message, where the sent S1 message carries the capability information indicating that the terminal supports the NR PDCP protocol or that the terminal supports the LTE-NR dual-connectivity function. After the base station receives the S1 message and determines, based on the capability information carried in the S1 message, that the terminal supports the NR PDCP protocol or that the terminal supports the LTE-NR dual-connectivity function, the base station sends the NR PDCP configuration to the terminal.

In a third scenario, the terminal accesses a source base station. It can be learned from the foregoing description that when the terminal accesses the source base station, the source base station may obtain capability information of the terminal. Therefore, when the terminal is handed over from the accessed source base station to a target base station, the target base station may obtain the capability information of the terminal from the source base station, and determine, based on the capability information obtained from the source base station, that the terminal supports the NR PDCP protocol or that the terminal supports the LTE-NR dual-connectivity function.

It should be understood that the foregoing three scenarios may be single-connection scenarios, or may be LTE-NR DC scenarios. In the LTE-NR DC scenario, the base station is a master base station.

302: The base station sends the NR PDCP configuration to the terminal.

In this way, after obtaining the NR PDCP configuration, the terminal may perform PDCP layer configuration in a corresponding scenario. For example, in a dual-connectivity scenario, the terminal performs related PDCP configuration on an accessed secondary base station based on a parameter in the NR PDCP configuration; and in a handover scenario, the terminal performs related PDCP configuration on an accessed target base station based on a parameter in the NR PDCP configuration. A specific process is not described herein.

In an implementation of this application, when the terminal initially accesses the base station, the terminal sends a piece of indication information to the base station, where the indication information may be carried in a message in a random access procedure. For example, the terminal sends the indication information to the base station by using a preamble or a random access message 3 (an RRC connection establishment request message or an RRC connection re-establishment message) or a random access message 5 (an RRC connection establishment complete message), where the indication information is used to indicate that the terminal supports the NR PDCP protocol or that the terminal supports the LTE-NR dual-connectivity function. When the base station determines, based on the indication information received from the terminal, that the terminal supports the NR PDCP protocol or that the terminal supports the LTE-NR dual-connectivity function, the base station sends the NR PDCP configuration to the terminal.

After determining that the terminal supports the NR PDCP protocol or that the terminal supports the LTE-NR dual-connectivity function, the base station sends the NR PDCP configuration to the terminal. In the LTE-NR dual-connectivity scenario, for more details about sending the NR PDCP configuration to the terminal by the base station, refer to the foregoing process of sending an NR PDCP configuration to a terminal in an EN-DC dual-connectivity scenario. Details are not described herein. It can be learned that this embodiment of this application proposes a specific scenario in which the base station sends the NR PDCP configuration to the terminal, improving feasibility and diversity of the solution.

For better implementation of the solutions described in the foregoing method embodiments of this application, the following further provides related apparatuses for implementing the foregoing solutions.

Figure 13:
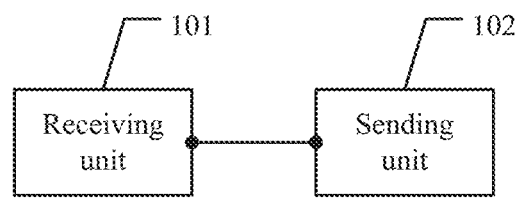
FIG. 13 is a schematic structural diagram of an embodiment of a base station according to an embodiment of this application.

FIG. 13 is a schematic structural diagram of an embodiment of a base station according to an embodiment of this application. The base station serves as the master base station described in the method embodiments of this application, and includes a receiving unit 101 and a sending unit 102.

The receiving unit 101 is configured to receive a new radio packet data convergence protocol NR PDCP configuration and identification information of a data radio bearer DRB corresponding to the NR PDCP configuration from a secondary base station.

The sending unit 102 is configured to send, to a terminal, the NR PDCP configuration and the identification information of the DRB that are received by the receiving unit 101.

The base station and the secondary base station are base stations of different RATs.

It can be learned that the base station shown in FIG. 13 may serve as a master base station, and when the base station and the secondary base station are base stations of different RATs, if an existing LTE DC mechanism is used, the base station may directly discard content sent by the secondary base station because the base station cannot parse the content. To avoid such a problem in an LTE-NR DC scenario, the secondary base station directly sends the NR PDCP configuration and the identification information of the DRB corresponding to the NR PDCP configuration to the base station via an interface between the base station and the secondary base station. The base station may receive, by using the receiving unit 101, the NR PDCP configuration and the identification information of the DRB corresponding to the NR PDCP configuration that are sent by the secondary base station, and the base station does not parse the NR PDCP configuration generated by the secondary base station, but directly forwards the received NR PDCP configuration and the received identification information of the corresponding DRB to the terminal by using the sending unit 102.

Optionally, that the receiving unit 101 is configured to receive an NR PDCP configuration and identification information of a DRB corresponding to the NR PDCP configuration from a secondary base station includes:

the receiving unit 101 is configured to receive a first container and the identification information of the DRB from the secondary base station, where the first container includes only the NR PDCP configuration.

That the sending unit 102 is configured to send, to a terminal, the NR PDCP configuration and the identification information of the DRB that are received by the receiving unit 101 includes:

the sending unit 102 is configured to send, to the terminal, the identification information of the DRB and the first container including only the NR PDCP configuration that are received by the receiving unit 101.

The first container has a one-to-one correspondence with the identification information of the DRB.

It can be learned that the secondary base station encapsulates only the generated NR PDCP configuration into the container and sends the container to the base station shown in FIG. 13. Because the base station shown in FIG. 13 does not need to parse content in the first container, the base station does not consider the received first container as an error packet, and finally successfully delivers the NR PDCP configuration to the terminal by using the first container. This effectively resolves a problem about how the secondary base station delivers the configuration to the terminal.

Optionally, that the receiving unit 101 is configured to receive an NR PDCP configuration and identification information of a DRB corresponding to the NR PDCP configuration from a secondary base station includes:

the receiving unit 101 is configured to receive a first container from the secondary base station, where the first container includes the NR PDCP configuration and the identification information of the DRB.

That the sending unit 102 is configured to send, to a terminal, the NR PDCP configuration and the identification information of the DRB that are received by the receiving unit 101 includes:

the sending unit 102 is configured to send the first container to the terminal, where the NR PDCP configuration has a one-to-one correspondence with the identification information of the DRB.

It can be learned that a difference from the foregoing implementation lies in that the first container not only includes the NR PDCP configuration of the secondary base station, but also includes the identification information of the DRB corresponding to the NR PDCP configuration, that is, the first container includes only the NR PDCP configuration of the secondary base station and the identification information of the DRB corresponding to the NR PDCP configuration. This increases diversity of the solution.

Optionally, the receiving unit 101 is further configured to:

receive a second container from the secondary base station, where the second container includes an air interface configuration of the secondary base station, and the air interface configuration of the secondary base station does not include the NR PDCP configuration.

The sending unit 102 is further configured to:

send the second container to the terminal.

The second container has a one-to-one correspondence with the identification information of the DRB. In other words, the base station shown in FIG. 13 not only sends the NR PDCP configuration to the terminal, but also sends the air interface configuration of the secondary base station to the terminal. This ensures integrity of the solution.

Figure 14:
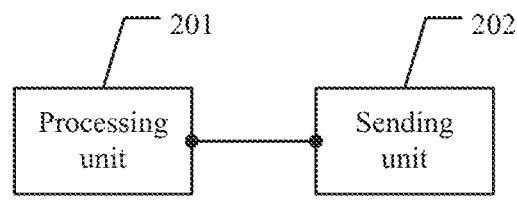
FIG. 14 is a schematic structural diagram of another embodiment of a base station according to an embodiment of this application.

FIG. 14 is a schematic structural diagram of another embodiment of a base station according to an embodiment of this application. The base station serves as the secondary base station described in the method embodiments of this application, and includes a processing unit 201 and a sending unit 202.

The processing unit 201 is configured to generate a new radio packet data convergence protocol NR PDCP configuration.

The sending unit 202 is configured to send, to a master base station, the NR PDCP configuration and identification information of a data radio bearer DRB corresponding to the NR PDCP configuration.

The base station and the master base station are base stations of different RATs.

Optionally, that the processing unit 201 is configured to generate an NR PDCP configuration includes:

the processing unit 201 is configured to generate a first container, where the first container includes only the NR PDCP configuration.

That the sending unit 202 is configured to send, to a master base station, the NR PDCP configuration and identification information of a DRB corresponding to the NR PDCP configuration includes:

the sending unit 202 is configured to send the first container generated by the processing unit 201 and the identification information of the DRB to the master base station, where the first container has a one-to-one correspondence with the identification information of the DRB.

Optionally, that the processing unit 201 is configured to generate an NR PDCP configuration includes:

the processing unit 201 is configured to generate a first container, where the first container includes only the NR PDCP configuration and the identification information of the DRB, and the NR PDCP configuration has a one-to-one correspondence with the identification information of the DRB.

That the sending unit 202 is configured to send, to a master base station, the NR PDCP configuration and identification information of a DRB corresponding to the NR PDCP configuration includes:

the sending unit 202 is configured to send the first container generated by the processing unit 201 to the master base station.

Optionally, the processing unit 201 is further configured to:

generate a second container, where the second container includes an air interface configuration of the secondary base station, the air interface configuration of the secondary base station does not include the NR PDCP configuration, and the second container has a one-to-one correspondence with the identification information of the DRB.

The sending unit 202 is further configured to:

send the second container to the master base station.

Figure 15:
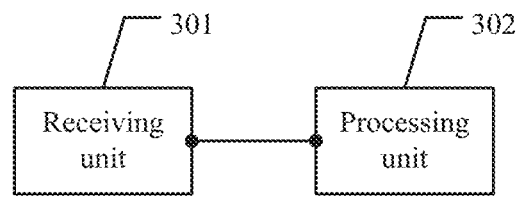
FIG. 15 is a schematic structural diagram of an embodiment of a terminal according to an embodiment of this application.

FIG. 15 is a schematic structural diagram of an embodiment of a terminal according to an embodiment of this application. The terminal includes a receiving unit 301 and a processing unit 302.

The receiving unit 301 is configured to receive a new radio packet data convergence protocol NR PDCP configuration and identification information of a data radio bearer DRB corresponding to the NR PDCP configuration from a master base station, where the NR PDCP configuration is a configuration generated by a secondary base station.

The processing unit 302 is configured to perform PDCP layer configuration on the DRB based on the NR PDCP configuration and the identification information of the DRB.

Optionally, that the receiving unit 301 is configured to receive an NR PDCP configuration and identification information of a DRB corresponding to the NR PDCP configuration from a master base station includes:

the receiving unit 301 is configured to receive a first container and the identification information of the DRB from the master base station, where the first container includes only the NR PDCP configuration, and the first container is a container generated by the secondary base station; and the first container has a one-to-one correspondence with the identification information of the DRB.

Optionally, that the receiving unit 301 is configured to receive an NR PDCP configuration and identification information of a DRB corresponding to the NR PDCP configuration from a master base station includes:

the receiving unit 301 is configured to receive a first container from the master base station, where the first container includes only the NR PDCP configuration and the identification information of the DRB, the first container is a container generated by the secondary base station, and the NR PDCP configuration has a one-to-one correspondence with the identification information of the DRB.

Figure 16:
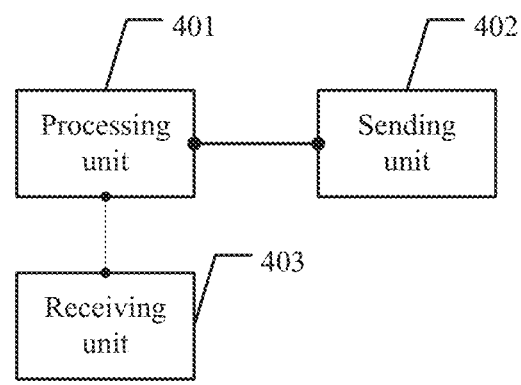
FIG. 16 is a schematic structural diagram of another embodiment of a base station according to an embodiment of this application.

FIG. 16 is a schematic structural diagram of another embodiment of a base station according to an embodiment of this application. The base station serves as a first base station described in the method embodiments of this application, and includes a processing unit 401 and a sending unit 402.

The processing unit 401 is configured to determine that a terminal supports the NR PDCP protocol or that a terminal supports an LTE-NR dual-connectivity function.

The sending unit 402 is configured to: if the processing unit 401 determines that the terminal supports the NR PDCP protocol or that the terminal supports the LTE-NR dual-connectivity function, send an NR PDCP configuration to the terminal.

It can be learned that when the terminal initially accesses the base station shown in FIG. 16, once the base station determines, by using the processing unit 401 and based on capability information reported by the terminal or a piece of indication information sent by the terminal, that the terminal supports the NR PDCP protocol or that the terminal supports the LTE-NR dual-connectivity function, the sending unit 402 can send the NR PDCP configuration (PDCP layer configuration information corresponding to an NR protocol) to the terminal. In this way, a specific transmission scenario in which the base station may send the NR PDCP configuration to the terminal is proposed, improving feasibility of the solution.

Optionally, the base station includes a receiving unit 403.

The receiving unit 403 is configured to receive a piece of indication information from the terminal when the terminal initially accesses the first base station, where the indication information may be carried in a message sent by the terminal in a random access procedure, for example, may be carried in a preamble sent by the terminal, or may be carried in, for example, an RRC connection establishment request message, an RRC connection re-establishment request message, or an RRC connection establishment complete message. That the processing unit 401 is configured to determine that a terminal supports the NR PDCP or that a terminal supports an LTE-NR dual-connectivity function includes: the processing unit 401 is configured to determine, based on the capability information received by the receiving unit 403, that the terminal supports the NR PDCP protocol or that the terminal supports the LTE-NR dual-connectivity function; or determine, based on the indication information, that the terminal supports the NR PDCP protocol or that the terminal supports the LTE-NR dual-connectivity function.

Optionally, the receiving unit 403 is configured to receive capability information of the terminal from the terminal when the terminal initially accesses the first base station; and that the processing unit 401 is configured to determine that a terminal supports the NR PDCP or that a terminal supports an LTE-NR dual-connectivity function includes: the processing unit 401 is configured to determine, based on the capability information received by the receiving unit 403, that the terminal supports the NR PDCP protocol or that the terminal supports the LTE-NR dual-connectivity function.

Optionally, the receiving unit 403 is configured to receive capability information of the terminal from a core network device when the terminal that has accessed the first base station enters active mode from idle mode.

That the processing unit 401 is configured to determine that a terminal supports the NR PDCP protocol or that a terminal supports an LTE-NR dual-connectivity function includes: the processing unit is configured to determine, based on the capability information received by the receiving unit 403, that the terminal supports the NR PDCP protocol or that the terminal supports the LTE-NR dual-connectivity function.

Optionally, the receiving unit 403 is configured to obtain capability information of the terminal from a second base station when the terminal is handed over from the second base station to the first base station.

That the processing unit 401 is configured to determine that a terminal supports the NR PDCP protocol or that a terminal supports an LTE-NR dual-connectivity function includes: the processing unit 401 is configured to determine, based on the capability information received by the receiving unit 403, that the terminal supports the NR PDCP protocol or that the terminal supports the LTE-NR dual-connectivity function, where the base station and the second base station are base stations of different RATs.

Optionally, the terminal accesses both the first base station and the second base station, where the first base station is a master base station in an LTE-NR dual-connectivity scenario, and the second base station is a secondary base station.

Optionally, in an implementation of this application, the receiving unit 403 may be configured to receive a piece of indication information from the terminal when the terminal initially accesses the first base station, where the indication information may be carried in a message sent by the terminal in a random access procedure, for example, may be carried in a preamble sent by the terminal, or may be carried in, for example, an RRC connection establishment request message, an RRC connection re-establishment request message, or an RRC connection establishment complete message. In this case, the processing unit 401 is further configured to determine, based on the indication information, that the terminal supports the NR PDCP protocol or that the terminal supports the LTE-NR dual-connectivity function.

It can be learned from the foregoing technical solutions that this embodiment of this application proposes the solution about how the terminal obtains the NR PDCP configuration in the LTE-NR DC scenario.

It should be noted that because content such as information exchange, procedure execution, and the like between the units of the foregoing apparatuses is based on a same concept as the method embodiments in the embodiments of this application, for more details, refer to the method embodiment part. The technical effects of the apparatuses are also the same as the technical effects of the method embodiments of this application. For details, refer to the descriptions in the foregoing method embodiments of this application. Details are not described herein.

In addition, it should be noted that division of the units of the foregoing apparatuses (the base station or the terminal) is merely division of logical functions. In actual implementation, all or some of the units may be integrated into one physical entity, or may be physically separated. In addition, all the units may be implemented in a form of software invoked by a processing element, or may be implemented in a form of hardware; or some units are implemented in a form of software invoked by a processing element, and some units are implemented in a form of hardware. This is not specifically limited. For example, the processing unit may be an independently disposed processing element, or may be integrated into a chip of the foregoing base station or terminal for implementation. In addition, the processing unit may be stored, in the form of program, in a memory in the foregoing base station or terminal, and be invoked by a processing element in the foregoing base station or terminal, to perform the functions of the processing unit. Implementation of another unit is similar to that of the processing unit. In addition, all or some of the units may be integrated together or may be implemented separately. The processing element herein may be an integrated circuit with a signal processing capability. In an implementation process, steps of the foregoing method or the foregoing units may be implemented by using an integrated logical circuit of hardware in the processor element, or by using an instruction in a form of software. In addition, the foregoing receiving unit is a unit for controlling reception, and may receive sent information by using a receiving apparatus of the foregoing base station or terminal, such as an antenna or a radio frequency apparatus (for example, a peer end of the base station is the terminal; or a peer end of the terminal is the base station). The foregoing sending unit is a unit for controlling transmission, and may send information to the peer end by using a sending apparatus of the foregoing base station or terminal, such as an antenna or a radio frequency apparatus.

For example, the foregoing units may be configured as one or more integrated circuits for implementing the foregoing methods, for example, one or more application-specific integrated circuits (ASIC), or one or more microprocessors (digital signal processor, DSP), or one or more field programmable gate arrays (FPGA). For another example, when one of the foregoing units is implemented by a processing element by scheduling a program, the processing element may be a processor, and the processor may be an integrated circuit chip with a signal processing capability. In an implementation process, steps of the foregoing methods may be implemented by a processor executing a computer program in a storage element. Specifically, the processing element may be a general-purpose processor, for example, a central processing unit (CPU) or a digital signal processor (DSP), an application-specific integrated circuit (ASIC), a field-programmable gate array (FPGA) or another programmable logic device, a discrete gate or a transistor logic device, or a discrete hardware component. The processing element may implement or perform the method, steps, and logical block diagrams disclosed in this embodiment of this application. The general-purpose processor may be a microprocessor or the processor may be any conventional processor, or the like. Steps of the methods disclosed in this embodiment of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The processing element may alternatively be another processor that can invoke a program. For another example, the foregoing units may be integrated together and implemented in a form of a system-on-a-chip (SOC).

Figure 17:
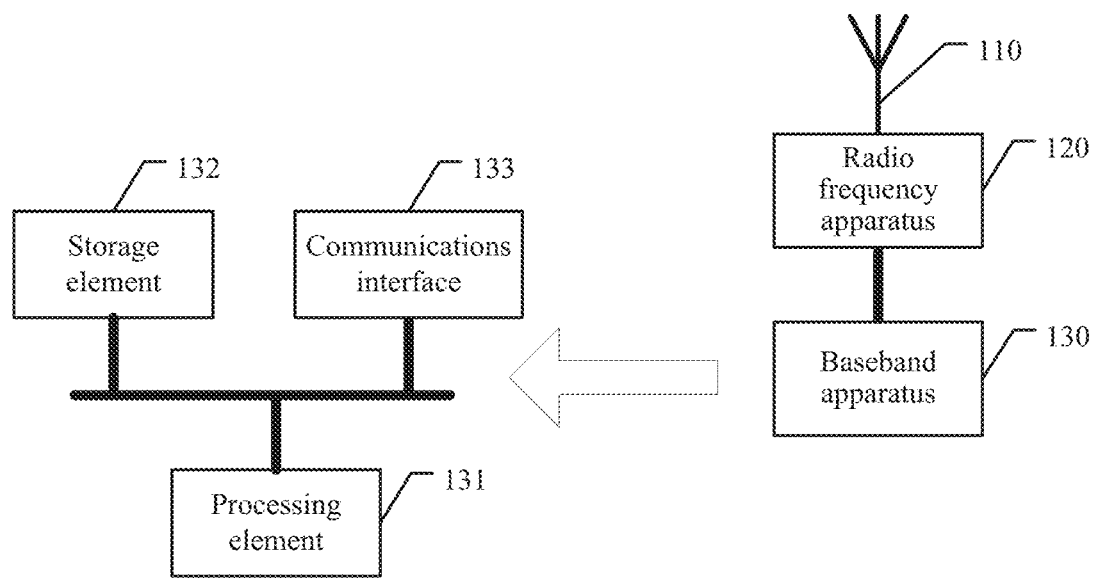
FIG. 17 is a schematic structural diagram of another embodiment of a base station according to an embodiment of this application.

FIG. 17 is a schematic structural diagram of another embodiment of a base station according to an embodiment of this application. The base station serves as the master base station described in the method embodiments of this application. As shown in FIG. 17, the base station includes an antenna 110, a radio frequency apparatus 120, and a baseband apparatus 130. The antenna 110 is connected to the radio frequency apparatus 120. In an uplink direction, the radio frequency apparatus 120 receives, by using the antenna 110, information sent by a terminal or another base station, and sends the information sent by the terminal or the another base station, to the baseband apparatus 130 for processing. In a downlink direction, the baseband apparatus 130 processes the information of the terminal or the another base station, and sends the processed information to the radio frequency apparatus 120. After processing the information of the terminal or the another base station, the radio frequency apparatus 120 sends the processed information to the terminal or the another base station by using the antenna 110.

In an implementation, the foregoing units are implemented by a processing element by scheduling a program. For example, the baseband apparatus 130 includes a processing element 131 and a storage element 132, where the processing element 131 invokes a program stored in the storage element 132, to perform the method on the base station side in the method embodiments. In addition, the baseband apparatus 130 may further include a communications interface 133, configured to exchange information with the radio frequency apparatus 120. The communications interface 133 may be, for example, a common public radio interface (CPRI).

In another implementation, the foregoing units may be configured as one or more processing elements for implementing the foregoing methods, and the processing elements are disposed on the baseband apparatus 130. The processing element herein may be an integrated circuit, for example, one or more ASICs, one or more DSPs, or one or more FPGAs. These integrated circuits may be integrated together to form a chip.

For example, the foregoing modules may be integrated together and implemented in a form of a system-on-a-chip (SOC). For example, the baseband apparatus 130 includes an SOC chip, and the chip is configured to implement base station side operations in the foregoing methods. The processing element 131 and the storage element 132 may be integrated in the chip, and the foregoing methods or the functions of the foregoing units may be implemented by the processing element 131 by invoking a program stored in the storage element 132. Alternatively, at least one integrated circuit may be integrated in the chip to implement the foregoing methods or functions of the foregoing units. Alternatively, the foregoing implementations may be combined, so that functions of some units are implemented by the processing element invoking a program, and functions of some units are implemented by using an integrated circuit.

In conclusion, regardless of the manners used, the base station includes at least one processing element and at least one storage element, where the at least one processing element is configured to perform the method provided in the foregoing method embodiments. The processing element may perform some or all of the steps in the foregoing method embodiments in a first manner, that is, by performing a program stored in the storage element; or the processing element may perform some or all of the steps on the base station side in the foregoing method embodiments in a second manner, that is, by using an integrated logic circuit of hardware in the processor element together with an instruction; or certainly, the processing element may perform the base station side method of the foregoing method embodiments in combination with the first manner and the second manner. It should be noted that for specific steps performed by the base station in this embodiment, refer to the corresponding processes in the foregoing embodiments, and details are not described herein.

As described above, herein the processing element may be a general-purpose processor, for example, a central processing unit (CPU), or may be one or more integrated circuits configured to implement the foregoing methods, for example, one or more application-specific integrated circuits (ASIC), or one or more microprocessors (digital signal processor, DSP), or one or more field programmable gate arrays (FPGA).

The storage element may be a memory, or may be a general term of a plurality of storage elements. The memory is used as an example. The memory may include a read-only memory (ROM) and a random access memory (RAM), or may be another memory or a storage medium. The memory provides an instruction and data for the processing element 131. A part of the memory may further include a non-volatile random access memory (NVRAM). The memory stores an operating system and an operation instruction, an executable module or a data structure, or a subset thereof, or an extended set thereof. The operation instruction may include various operation instructions that are used to implement various operations. The operating system may include various system programs that are used to implement various basic services and process a hardware-based task.

Figure 18:
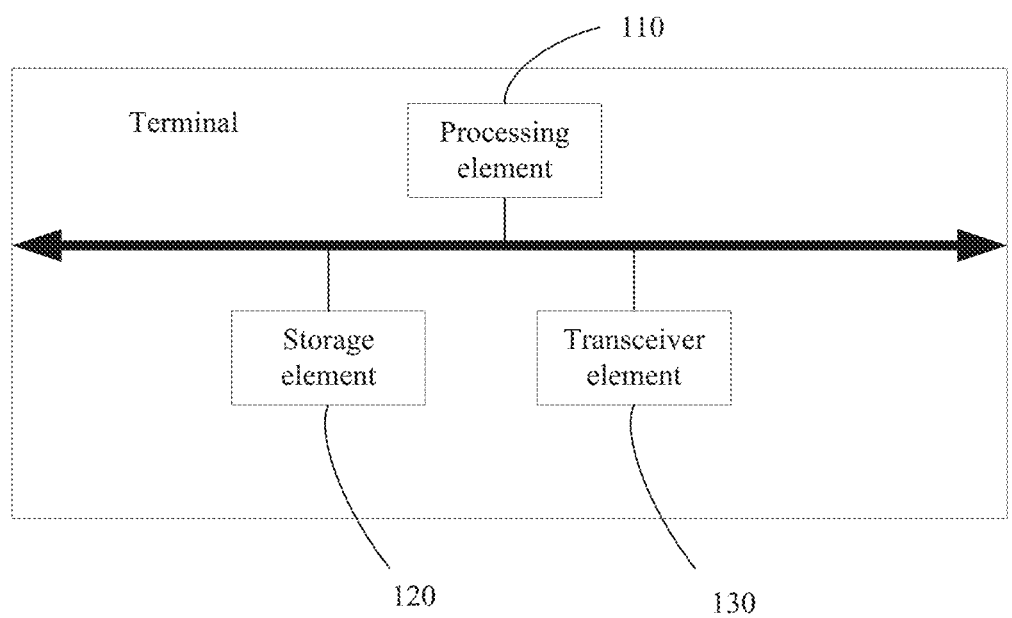
FIG. 18 is a schematic structural diagram of another embodiment of a base station according to an embodiment of this application.

FIG. 18 is a schematic structural diagram of another embodiment of a terminal according to an embodiment of this application. As shown in FIG. 18, the terminal includes a processing element 110, a storage element 120, and a transceiver element 130. The transceiver element 130 may be connected to an antenna. In a downlink direction, the transceiver element 130 receives, by using the antenna, information sent by a base station, and sends the information to the processing element 110 for processing. In an uplink direction, the processing element 110 processes data of the terminal, and sends the data of the terminal to the base station by using the transceiver element 130.

The storage element 120 is configured to store a program for implementing the foregoing method embodiments. The processing element 110 invokes the program to perform operations in the foregoing method embodiments.

In another implementation, the foregoing modules may be configured as one or more processing elements for implementing the foregoing methods. These processing elements are disposed on a circuit board of the terminal. The processing element herein may be an integrated circuit, for example, one or more ASICs, one or more DSPs, or one or more FPGAs. These integrated circuits may be integrated together to form a chip.

For example, the foregoing units may be integrated together and implemented in a form of a system-on-a-chip (SOC). For example, the terminal includes an SOC chip, and the chip is configured to implement terminal side operations in the foregoing methods. The processing element 110 and the storage element 120 may be integrated into the chip, and the processing element 110 invokes the program stored in the storage element 120, to implement the foregoing methods or functions of the foregoing modules. Alternatively, at least one integrated circuit may be integrated in the chip to implement the foregoing methods or functions of the foregoing modules. Alternatively, the foregoing implementations may be combined, so that functions of some units are implemented by the processing element invoking a program, and functions of some units are implemented by using an integrated circuit.

In conclusion, regardless of the manners used, the terminal includes at least one processing element and a storage element, where the at least one processing element is configured to perform the method provided in the foregoing method embodiments. The processing element may perform some or all of the steps in the foregoing method embodiments in a first manner, that is, by performing a program stored in the storage element; or the processing element may perform some or all of the steps on the terminal side in the foregoing method embodiments in a second manner, that is, by using an integrated logic circuit of hardware in the processor element together with an instruction; or certainly, the processing element may perform the terminal side method of the foregoing method embodiments in combination with the first manner and the second manner.

As described above, the processing element herein may be a general-purpose processing element, such as a CPU, or may be configured as one or more integrated circuits that implement the foregoing methods, such as one or more ASICs, one or more DSPs, or one or more field programmable gate arrays (FPGA).

The storage element may be a memory, or may be a general term of a plurality of storage elements. The memory is used as an example. The memory may include a ROM and a RAM, or may be another memory or storage medium. The memory provides an instruction and data for the processing element 110. A part of the memory may further include an NVRAM. The memory stores an operating system and an operation instruction, an executable module or a data structure, or a subset thereof, or an extended set thereof. The operation instruction may include various operation instructions that are used to implement various operations. The operating system may include various system programs that are used to implement various basic services and process a hardware-based task.

An embodiment of this application provides a computer readable storage medium. It should be noted that the technical solution proposed in this application essentially, or the part contributing to the prior art, or all or some of the technical solution may be implemented in a form of a software product. The computer software product is stored in a storage medium configured to store a computer software instruction used by the foregoing base station or terminal. The storage medium includes a USB flash drive, a removable hard disk, a read-only memory (ROM), a random access memory (RAM), a disk or compact disc, and other media that can store program code. When the instruction included in the storage medium is run on a computer, the computer implements all or some of the steps of the terminal or base station described in the method embodiments.

An embodiment of this application further provides a communications apparatus, including at least one storage element and at least one processing element. The at least one storage element is configured to store a program, and when the program is executed, the communications apparatus performs an operation of the terminal in the information processing method in any one of the foregoing embodiments. The apparatus may be a terminal chip.

An embodiment of this application further provides a communications apparatus, including at least one storage element and at least one processing element. The at least one storage element is configured to store a program, and when the program is executed, the communications apparatus performs an operation of the base station (master base station or secondary base station) in the information processing method in any one of the foregoing embodiments. The apparatus may be a base station chip.

An embodiment of this application provides a communications system, including the master base station and the secondary base station described in the foregoing aspects, where the communications system may further include the terminal described in the foregoing aspects.

All or some of the foregoing embodiments may be implemented in software, hardware, firmware, or any combination thereof. When the embodiments are implemented in software, the embodiments may be implemented completely or partially in a form of a computer program product. The computer program product includes one or more computer instructions. When the one or more computer program instructions are loaded and executed on the computer, the procedures or functions according to the embodiments of the present invention are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium, for example, a solid state disk (SSD).

In the several embodiments provided in this application, it should be understood that the disclosed system, module, and method may be implemented in other manners. For example, the described apparatus embodiments are merely examples. For example, the module division is merely logical function division and may be other division in actual implementation. For example, a plurality of modules or components may be combined or integrated into another system, or some features may be ignored or may be not performed. In addition, the displayed or discussed mutual couplings or direct couplings or communication connections may be implemented by using some interfaces. The indirect couplings or communication connections between the apparatuses or units may be implemented in electronic, mechanical, or other forms. In addition, in the accompanying drawings of the apparatus embodiments provided in the present invention, connection relationships between the modules indicate that there are communication connections between the modules, and the communication connections may be specifically implemented as one or more communications buses or signal cables.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the integrated module is implemented in the form of a software functional unit and sold or used as an independent product, the integrated module may be stored in a computer-readable storage medium. Based on such an understanding, the technical solutions in this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A communications system that includes a master base station and a secondary base station of different radio access technologies (RATs), wherein
   the secondary base station is configured to: send a first container and a second container to a master base station, wherein the first container comprises a new radio packet data convergence protocol (NR PDCP) configuration of the secondary base station, and identification information of a data radio bearer (DRB) corresponding to the NR PDCP configuration, and the second container comprises an air interface configuration of the secondary base station except the NR PDCP configuration;
   the master base station is configured to:
   receive the first container and the second container from the secondary base station; and
   send the first container and the second container to a terminal.

2. The system according to claim 1, wherein
   the NR PDCP configuration corresponding to a secondary cell group bearer (SCG bearer) of the secondary base station, or the NR PDCP configuration corresponding to a secondary cell group split bearer (SCG split bearer) of the secondary base station.

3. The system according to claim 1, wherein
   the secondary base station is configured to generate the first container.

4. The system according to claim 3, wherein
   the secondary base station is configured to encapsulate the NR PDCP configuration and the identification information of the DRB into the first container.

5. The system according to claim 1, wherein
   the secondary base station is further configured to generate the second container.

6. The system according to claim 1, wherein
   both the first container and the second container are in a container sent from the secondary base station to the master base station.

7. The system according to claim 1, wherein both the master base station and the secondary base station use NR PDCP.

8. An information processing method in a communications system including a master base station and a secondary base station of different radio access technologies (RATs), wherein the method comprises:
   sending, by the secondary base station, a first container and a second container to the master base station, wherein the first container comprises a new radio packet data convergence protocol (NR PDCP) configuration of the secondary base station, and identification information of a data radio bearer (DRB) corresponding to the NR PDCP configuration, and the second container comprises an air interface configuration of the secondary base station except the NR PDCP configuration;
   receiving, by the master base station, the first container and the second container from the secondary base station; and
   sending, by the master base station, the first container and the second container to a terminal.

9. The method according to claim 8, wherein:
   the NR PDCP configuration comprises a PDCP configuration of a secondary cell group bearer (SCG bearer) on the secondary base station, or
   a PDCP configuration of a secondary cell group split bearer (SCG split bearer) on the secondary base station.

10. The method according to claim 8, further comprising:
    generating, by the secondary base station, the first container.

11. The method according to claim 10, wherein the generating, by the secondary base station, the first container comprises:
    encapsulating, by the secondary base station, the NR PDCP configuration and the identification information of the DRB into the first container.

12. The method according to claim 8, further comprising:
    generating, by the secondary base station, the second container.

13. The method according to claim 8, wherein
    both the first container and the second container are in a container sent from the secondary base station to the master base station.

14. The method according to claim 8, wherein both the master base station and the secondary base station use NR PDCP.

15. An information processing method, comprising:
    receiving, by a terminal, a new radio packet data convergence protocol (NR PDCP) configuration of a secondary base station, identification information of a data radio bearer (DRB) corresponding to the NR PDCP configuration, and an air interface configuration of the secondary base station except the NR PDCP configuration from a master base station, wherein the NR PDCP configuration and identification information of the DRB are comprised in a first container sent from the master base station and generated by the secondary base station, the air interface configuration is comprised in a second container sent from the master base station and generated by the secondary base station; and applying, by the terminal, the NR PDCP configuration to the DRB.

16. The method according to claim 15, wherein
the NR PDCP configuration corresponding to a secondary cell group bearer (SCG bearer) of the secondary base station, or the NR PDCP configuration corresponding to a secondary cell group split bearer (SCG split bearer) of the secondary base station.

17. The method according to claim 15, wherein both the first container and the second container are in a container sent from the secondary base station to the master base station.

18. The method according to claim 15, wherein both the master base station and the secondary base station use NR PDCP.

19. An apparatus, comprising:
an interface circuit coupled with at least one processor, configured to receive a new radio packet data convergence protocol (NR PDCP) configuration of a secondary base station, identification information of a data radio bearer (DRB) corresponding to the NR PDCP configuration, and an air interface configuration of the secondary base station except the NR PDCP configuration from a master base station, wherein the NR PDCP configuration and identification information of the DRB are comprised in a first container sent from the master base station and generated by the secondary base station, and the air interface configuration is comprised in a second container sent from the master base station and generated by the secondary base station; and the at least one processor, configured to apply the NR PDCP configuration to the DRB.

20. The apparatus according to claim 19, wherein
the NR PDCP configuration corresponding to a secondary cell group bearer (SCG bearer) of the secondary base station, or the NR PDCP configuration corresponding to a secondary cell group split bearer (SCG split bearer) of the secondary base station.

21. The apparatus according to claim 19, wherein both the first container and the second container are in a container sent from the secondary base station to the master base station.

22. The apparatus according to claim 19, wherein both the master base station and the secondary base station use NR PDCP.

* * * * *

UNITED STATES PATENT AND TRADEMARK OFFICE
CERTIFICATE OF CORRECTION

PATENT NO. : 10,785,824 B2
APPLICATION NO. : 16/714235
DATED : September 22, 2020
INVENTOR(S) : Jing Liu et al.

Page 1 of 1

It is certified that error appears in the above-identified patent and that said Letters Patent is hereby corrected as shown below:

On the Title Page

Item (56), in Column 2, Line 2, delete "Acces" and insert -- Access, --, therefor.

Signed and Sealed this
Twenty-ninth Day of December, 2020

Andrei Iancu
*Director of the United States Patent and Trademark Office*